United States Patent
Aoki et al.

(10) Patent No.: US 8,794,056 B2
(45) Date of Patent: Aug. 5, 2014

(54) ABNORMALITY DETERMINATION DEVICE FOR AIR-FUEL RATIO SENSOR

(75) Inventors: Takeshi Aoki, Wako (JP); Atsuhiro Miyauchi, Wako (JP); Michinori Tani, Wako (JP); Hiroyuki Ando, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 239 days.

(21) Appl. No.: 13/312,998

(22) Filed: Dec. 7, 2011

(65) Prior Publication Data

US 2012/0192634 A1    Aug. 2, 2012

(30) Foreign Application Priority Data

Jan. 27, 2011    (JP) ................................. 2011-015045

(51) Int. Cl.
     *G01M 15/10*      (2006.01)

(52) U.S. Cl.
     USPC .................................................... 73/114.72

(58) Field of Classification Search
     CPC ..... F01N 11/00; F01N 11/002; F01N 11/005; F01N 11/007
     USPC ............... 73/114.69, 114.71, 114.72, 114.73, 73/114.77
     See application file for complete search history.

(56) References Cited

U.S. PATENT DOCUMENTS

| | | | |
|---|---|---|---|
| 5,819,195 A * | 10/1998 | Iwata | 701/103 |
| 7,499,789 B2 * | 3/2009 | Toda et al. | 701/109 |
| 2004/0261498 A1 * | 12/2004 | Hattori | 73/23.32 |
| 2005/0131601 A1 * | 6/2005 | Kunihiro et al. | 701/34 |
| 2006/0265116 A1 * | 11/2006 | Ozaki et al. | 701/109 |
| 2008/0154528 A1 * | 6/2008 | Iwazaki | 702/100 |
| 2008/0189008 A1 * | 8/2008 | Iwazaki | 701/29 |
| 2008/0251057 A1 * | 10/2008 | Iwazaki | 123/690 |
| 2008/0271435 A1 * | 11/2008 | Aono et al. | 60/277 |
| 2010/0186491 A1 * | 7/2010 | Shibata et al. | 73/114.72 |
| 2011/0271665 A1 * | 11/2011 | Iwazaki et al. | 60/301 |

FOREIGN PATENT DOCUMENTS

| | | |
|---|---|---|
| JP | 2812252 B2 | 1/1997 |
| JP | 2003-020989 | 1/2003 |

* cited by examiner

*Primary Examiner* — Eric S McCall
(74) *Attorney, Agent, or Firm* — Mori & Ward, LLP

(57) ABSTRACT

An abnormality determination device for an air-fuel ratio sensor includes a differential value calculator and an abnormality determiner. The differential value calculator is configured to calculate a differential value of an output value of the air-fuel ratio sensor which is configured to detect an air-fuel ratio of exhaust gas. The abnormality determiner is configured to determine abnormality of the air-fuel ratio sensor based on a result of comparison between a reference output value of the air-fuel ratio sensor and a predetermined threshold. The reference output value is obtained by the air-fuel ratio sensor when the differential value calculated by the differential value calculator becomes a predetermined value.

18 Claims, 19 Drawing Sheets

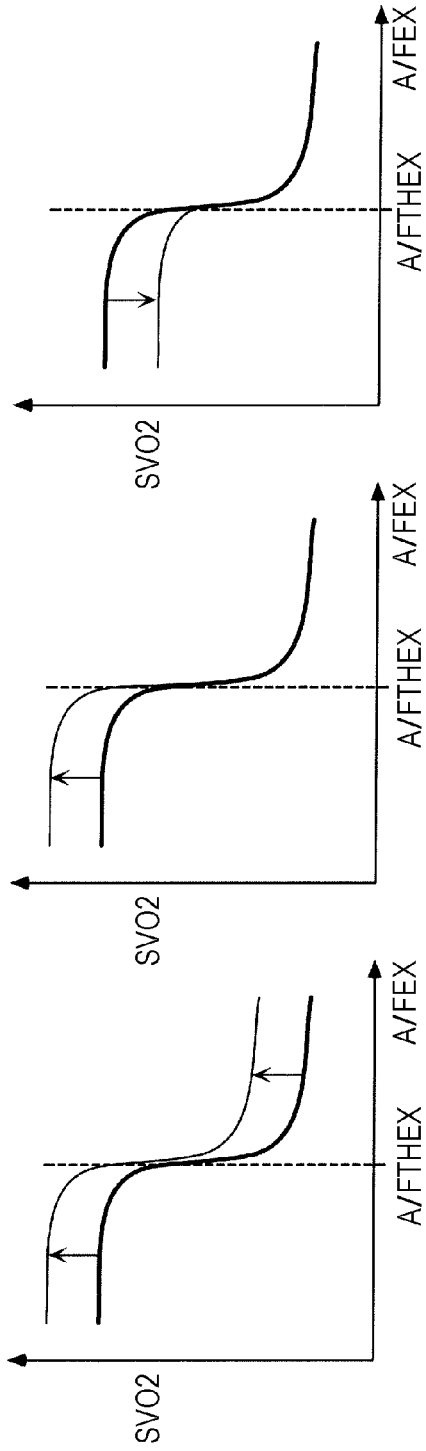
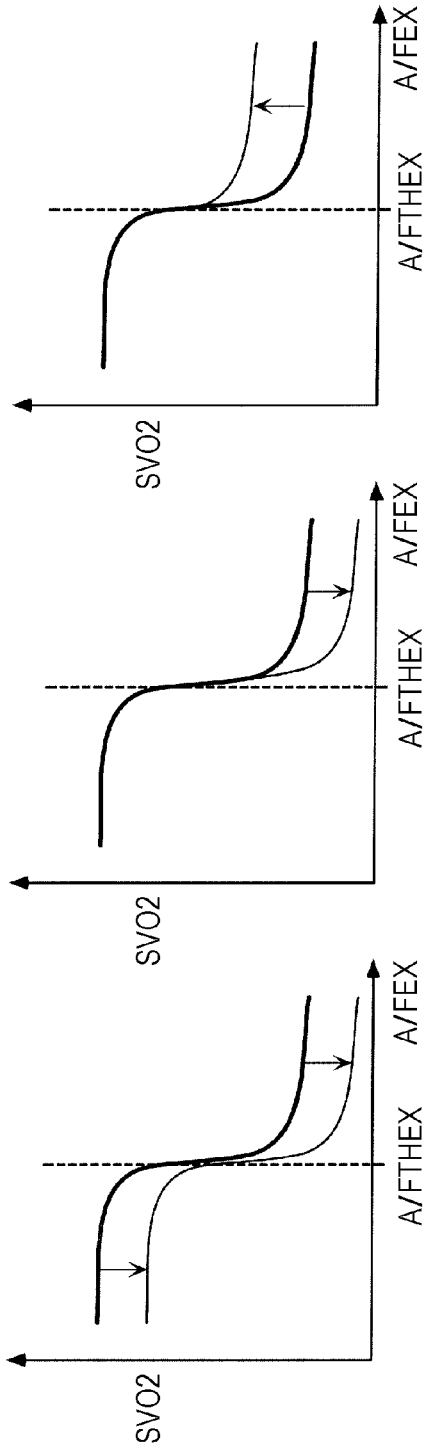

FIG. 19

| | F_INVH2 | F_INRERR | F_INPERR | F_INLERR | F_INVL2 |
|---|---|---|---|---|---|
| OPERATION UNDER NORMAL CONDITIONS | 0 | 0 | 0 | 0 | 0 |
| (a) RICH-SIDE OFFSET | 0 | 1 | 1 | 1 | 1 |
| (b) LEAN-SIDE OFFSET | 1 | 1 | 1 | 1 | 0 |
| (c) RICH-ONLY OFFSET | 0 | 1 | 1 | 0 | 0 |
| (d) LEAN-ONLY OFFSET | 0 | 0 | 1 | 1 | 0 |
| (e) RICH DISTORTION | 1 | 1 | 1 | 0 | 0 |
| (f) LEAN DISTORTION | 0 | 0 | 1 | 1 | 1 |

ABNORMALITY DETERMINATION DEVICE FOR AIR-FUEL RATIO SENSOR

CROSS-REFERENCE TO RELATED APPLICATIONS

The present application claims priority under 35 U.S.C. §119 to Japanese Patent Application No. 2011-015045, filed Jan. 27, 2011, entitled "Abnormality Determination Device for Air-Fuel Ratio Sensor." The contents of this application are incorporated herein by reference in their entirety.

BACKGROUND OF THE INVENTION

1. Field of the Invention

The present invention relates to an abnormality determination device for an air-fuel ratio sensor.

2. Discussion of the Background

A conventional abnormality determination device for an air-fuel ratio sensor of this type is disclosed in, for example, Japanese Patent No. 2812252. The air-fuel ratio sensor is of the so-called inverse type having an output characteristic that the output value rapidly changes before and after an exhaust gas air-fuel ratio corresponding to the theoretical air-fuel ratio of the air-fuel mixture. In this abnormality determination device, a differential value of an output value of the air-fuel ratio sensor is calculated, and the number of times the differential value becomes less than or equal to a predetermined value is counted. If the count value obtained during a predetermined period is below a predetermined value, the output value is regarded as being stagnant (the sensor is regarded as malfunctioning) and it is determined that an abnormality has occurred in the air-fuel ratio sensor.

Another conventional abnormality determination device for an air-fuel ratio sensor is disclosed in Japanese Unexamined Patent Application Publication No. 2003-20989. The air-fuel ratio sensor has an output characteristic that the larger the exhaust gas air-fuel ratio, that is, the leaner the exhaust gas air-fuel ratio, the larger the output value. In this abnormality determination device, a maximum value of a differential value of an output value of the air-fuel ratio sensor is calculated when normal operation resumes after the termination of the fuel-cut operation that stops the supply of fuel to an internal combustion engine. When a state where the maximum value is smaller than a predetermined value occurs twice consecutively, the output value is regarded as being stagnant and it is determined that an abnormality has occurred in the air-fuel ratio sensor.

SUMMARY OF THE INVENTION

According to one aspect of the present invention, an abnormality determination device for an air-fuel ratio sensor comprises a differential value calculator and an abnormality determiner. The differential value calculator is configured to calculate a differential value of an output value of the air-fuel ratio sensor which is configured to detect an air-fuel ratio of exhaust gas. The abnormality determiner is configured to determine abnormality of the air-fuel ratio sensor based on a result of comparison between a reference output value of the air-fuel ratio sensor and a predetermined threshold. The reference output value is obtained by the air-fuel ratio sensor when the differential value calculated by the differential value calculator becomes a predetermined value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 14A to 14F are diagrams illustrating, by abnormality pattern, output characteristics of the oxide concentration sensor.

FIG. 19 is a table illustrating the relationships between abnormality patterns of the oxide concentration sensor and flag values.

DESCRIPTION OF THE EMBODIMENTS

Figure 1:
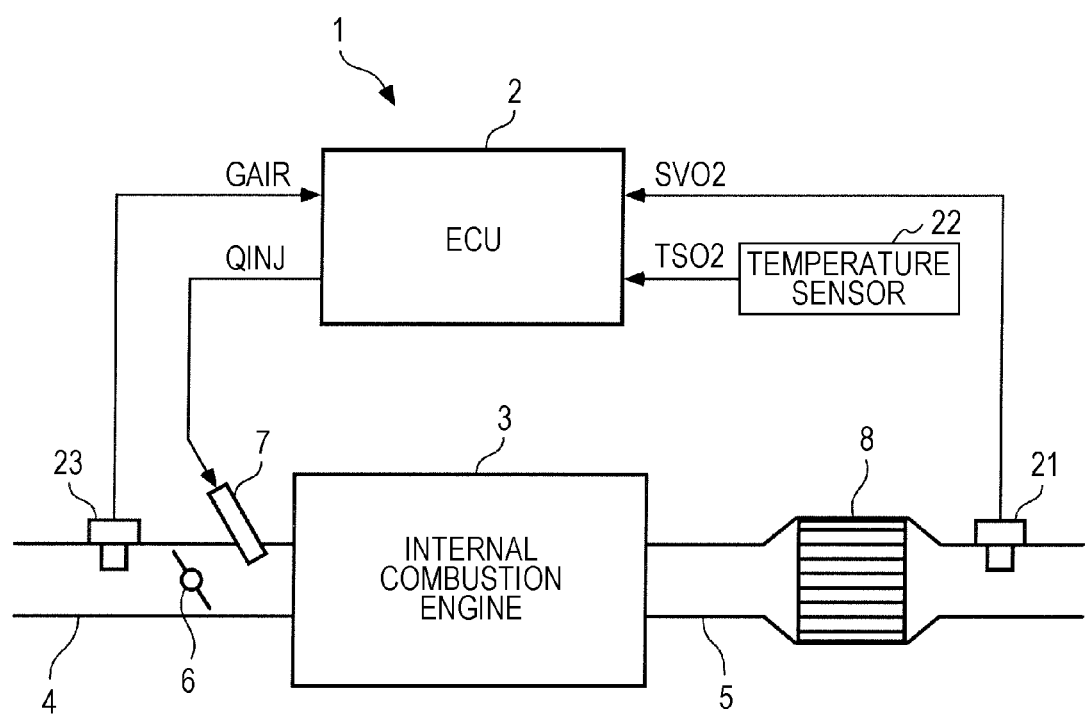
FIG. 1 is a diagram illustrating an abnormality determination device for an air-fuel ratio sensor according to an embodiment of the present invention, together with an internal combustion engine.

According to an embodiment of the present invention, there is provided an abnormality determination device (abnormality determination device 1) for an air-fuel ratio sensor (oxide concentration sensor 21), for determining abnormality of the air-fuel ratio sensor that is disposed in an exhaust path (exhaust pipe 5) of an internal combustion engine (internal combustion engine 3) and that detects an air-fuel ratio of exhaust gas (exhaust gas air-fuel ratio A/FEX). The air-fuel ratio sensor has an output characteristic that the air-fuel ratio of the exhaust gas gradually changes between lean and rich with respect to a theoretical exhaust gas air-fuel ratio (theoretical exhaust gas air-fuel ratio A/FTHEX) which is an exhaust gas air-fuel ratio corresponding to a theoretical air-fuel ratio of air-fuel mixture. The abnormality determination device includes a differential value calculator (ECU 2, step 3 in FIG. 3) configured to calculate a differential value (O2 differential value DSVO2) of an output value (O2 output value SVO2) of the air-fuel ratio sensor, and an abnormality determiner (ECU 2, FIG. 5, FIG. 9) configured to determine abnormality of the air-fuel ratio sensor on the basis of a result of comparison between an output value of the air-fuel ratio sensor obtained when the calculated differential value of the output value of the air-fuel ratio sensor becomes a predetermined value (start-time peak differential value DINP, start-time basic differential value DINBASE, end-time peak differential value DOUTP, end-time basic differential value DOUTBASE) and a predetermined threshold (first upper limit VH1, second upper limit VH2, first lower limit VL1, second lower limit VL2).

An abnormality determination device according to the embodiment of the present invention calculates a differential value of an output value of an air-fuel ratio sensor, and determines abnormality of the air-fuel ratio sensor on the basis of a result of comparison between an output value of the air-fuel ratio sensor obtained when the calculated differential value becomes a predetermined value and a predetermined threshold. The air-fuel ratio sensor has an output characteristic that an air-fuel ratio of exhaust gas gradually changes between lean and rich with respect to a theoretical exhaust gas air-fuel ratio. Thus, if the air-fuel ratio sensor is operating under normal conditions when the air-fuel ratio of the exhaust gas changes with respect to the theoretical exhaust gas air-fuel ratio, an output value of the air-fuel ratio sensor and the differential value of the output value change while maintaining a predetermined relationship therebetween corresponding to the output characteristic of the air-fuel ratio sensor.

With the above relationship, a deviation of the output value of the air-fuel ratio sensor obtained when the differential value becomes the predetermined value (hereinafter referred to as the "reference-time output value") with respect to a predetermined threshold based on the predetermined relationship described above indicates that, for example, an abnormality caused by an output characteristic deviation of the air-fuel ratio sensor has occurred due to a total or partial offset or the like of the output value. Therefore, the reference-time output value of the air-fuel ratio sensor is compared with the predetermined threshold, and whether an abnormality has occurred in the air-fuel ratio sensor is determined on the basis of the result of the comparison. This enables detection of various patterns of abnormality, and allows appropriate determination of the abnormality of the air-fuel ratio sensor. Furthermore, for example, appropriate air-fuel ratio control for the internal combustion engine is possible based on the result of the determination of the abnormality of the air-fuel ratio sensor, resulting in the improvement of the exhaust gas characteristics of the internal combustion engine.

In the abnormality determination device (abnormality determination device 1) according to the embodiment of the present invention, the air-fuel ratio sensor may have an output characteristic that the rate of change of the air-fuel ratio of the exhaust gas becomes maximum around the theoretical exhaust gas air-fuel ratio (theoretical exhaust gas air-fuel ratio A/FTHEX). The predetermined value may be a local extremum (start-time peak differential value DINP, end-time peak differential value DOUTP) of the differential value, and the predetermined threshold may include a first threshold (first upper limit VH1) and a second threshold (first lower limit VL1). The abnormality determiner may determine (step 43 in FIG. 6, step 83 in FIG. 10) abnormality of the air-fuel ratio sensor in accordance with whether or not the output value (start-time peak output value VINP, end-time peak output value VOUTP) of the air-fuel ratio sensor obtained when the differential value becomes the predetermined value is between the first threshold and the second threshold.

With the above configuration, an output value of the air-fuel ratio sensor obtained when the differential value of the output value of the air-fuel ratio sensor becomes a local extremum is used as a reference-time output value, and the abnormality of the air-fuel ratio sensor is determined in accordance with whether or not the reference-time output value between the first threshold and the second threshold. The air-fuel ratio sensor has an output characteristic that the rate of change becomes maximum around the theoretical exhaust gas air-fuel ratio. Thus, the differential value of the output value becomes a local extremum around the theoretical exhaust gas air-fuel ratio. Therefore, the absence of the reference-time output value between the first threshold and the second threshold indicates that an output characteristic deviation of the air-fuel ratio sensor has occurred around the theoretical exhaust gas air-fuel ratio. Accordingly, the presence of abnormality of the air-fuel ratio sensor around the theoretical exhaust gas air-fuel ratio can be appropriately determined in accordance with whether or not the reference-time output value is between the first threshold and the second threshold. Furthermore, since the predetermined value, which defines the reference-time output value, is a local extremum of the differential value, the reference points that abnormality determination is based on can be more clearly identified than those when the predetermined value is a value other than a local extremum. Thus, appropriate abnormality determination of the air-fuel ratio sensor can be achieved.

In the abnormality determination device (abnormality determination device 1) according to the embodiment of the present invention, the air-fuel ratio sensor may have an output characteristic that the rate of change of the air-fuel ratio of the exhaust gas becomes maximum around the theoretical exhaust gas air-fuel ratio (theoretical exhaust gas air-fuel ratio A/FTHEX). The predetermined value may be a value (start-time basic differential value DINBASE, end-time basic differential value DOUTBASE) between 0 and a local extremum of the differential value, and the predetermined threshold may include a third threshold (second upper limit VH2) and a fourth threshold (second lower limit VL2). The abnormality determiner may determine (step 54 in FIG. 7, step 62 in FIG. 8, step 94 in FIG. 11, step 102 in FIG. 12) abnormality of the air-fuel ratio sensor in accordance with whether or not the output value (start-time rich output value VINR, start-time lean output value VINL, end-time lean output value VOUTL, end-time rich output value VOUTR) of the air-fuel ratio sensor obtained when the differential value becomes the predetermined value is between the third threshold and the fourth threshold.

With the above configuration, similarly to the configuration described above, the air-fuel ratio sensor has an output characteristic that the rate of change becomes maximum around the theoretical exhaust gas air-fuel ratio. Thus, the differential value of the output value becomes a local extremum around the theoretical exhaust gas air-fuel ratio. Furthermore, the output value of the air-fuel ratio sensor obtained when the differential value becomes a predetermined value between 0 and a local extremum of the differential value is used as a reference-time output value, and the abnormality of the air-fuel ratio sensor is determined in accordance with whether or not the reference-time output value is between the third threshold and the fourth threshold. Therefore, the reference-time output value being not between the third threshold and the fourth threshold indicates that an output characteristic deviation of the air-fuel ratio sensor has occurred in an exhaust gas air-fuel ratio region other than approximately the theoretical exhaust gas air-fuel ratio. Accordingly, the presence of abnormality of the air-fuel ratio sensor in the exhaust gas air-fuel ratio region described above can be appropriately determined in accordance with whether or not the reference-time output value is between the third threshold and the fourth threshold.

Additionally, since the predetermined value is a value between 0 and a local extremum of the differential value, when the exhaust gas air-fuel ratio changes passing through the theoretical exhaust gas air-fuel ratio, the differential value becomes the predetermined value regardless of whether the exhaust gas air-fuel ratio is rich or lean with respect to the theoretical exhaust gas air-fuel ratio. Therefore, the presence of abnormality of the air-fuel ratio sensor in the rich and lean regions with respect to approximately the theoretical exhaust gas air-fuel ratio can be appropriately determined in accordance with whether or not the reference-time output value is between the third threshold and the fourth threshold. In addition, the abnormality determination may be performed in conjunction with the abnormality determination with the configuration described above. In this case, abnormality determination of the air-fuel ratio sensor in a broader exhaust gas air-fuel ratio region including approximately the theoretical exhaust gas air-fuel ratio can be appropriately performed in an integral and comprehensive manner.

In the abnormality determination device (abnormality determination device 1) according to the embodiment of the present invention, the predetermined threshold may include a fifth threshold (second upper limit VH2, second lower limit VL2) set to at least one of an approximately upper limit and an approximately lower limit of an output range of the air-fuel ratio sensor. The abnormality determiner may determine (step 52 in FIG. 7, step 64 in FIG. 8, step 92 in FIG. 11, step 104 in FIG. 12) abnormality of the air-fuel ratio sensor in accordance with whether or not the output value of the air-fuel ratio sensor has changed across the fifth threshold.

With the above configuration, the abnormality determiner determines abnormality of the air-fuel ratio sensor in accordance with whether or not the output value of the air-fuel ratio sensor has changed across the fifth threshold. The fifth threshold is set to approximately the upper limit and/or lower limit of the output range of the air-fuel ratio sensor. Therefore, for example, when the fifth threshold is set to a value smaller than the upper limit of the actual output range of the air-fuel ratio sensor, if the output value of the air-fuel ratio sensor has not passed through the fifth threshold, it can be determined that a deviation of the output value of the air-fuel ratio sensor that does not reach the upper limit of the actual output range has occurred. When the fifth threshold is set to a value larger than the upper limit of the output range of the air-fuel ratio sensor, if the output value of the air-fuel ratio sensor has passed through the fifth threshold, it can be determined that a deviation of the output value of the air-fuel ratio sensor that exceeds the upper limit of the output range has occurred.

Therefore, the abnormality of the air-fuel ratio sensor in an exhaust gas air-fuel ratio region corresponding to approximately the upper limit and/or lower limit of the output range of the air-fuel ratio sensor can be determined in accordance with whether or not the output value of the air-fuel ratio sensor has changed across the fifth threshold. In addition, the abnormality determination may be performed in conjunction with the abnormality determination with the configurations described above. In this case, the presence of abnormality of the air-fuel ratio sensor in a broader exhaust gas air-fuel ratio region can be appropriately determined in a more integral and comprehensive manner.

In the abnormality determination device (abnormality determination device 1) according to the embodiment of the present invention, the abnormality determiner may determine (step 9, step 10, step 13, step 14 in FIG. 3) abnormality of the air-fuel ratio sensor when the air-fuel ratio of the exhaust gas changes from rich to lean with respect to the theoretical exhaust gas air-fuel ratio (theoretical exhaust gas air-fuel ratio A/FTHEX), passing through the theoretical exhaust gas air-fuel ratio (theoretical exhaust gas air-fuel ratio A/FTHEX), in accordance with start of a fuel-cut operation that stops supply of fuel to the internal combustion engine (internal combustion engine 3), and/or when the air-fuel ratio of the exhaust gas changes from lean to rich with respect to the theoretical exhaust gas air-fuel ratio (theoretical exhaust gas air-fuel ratio A/FTHEX), passing through the theoretical exhaust gas air-fuel ratio (theoretical exhaust gas air-fuel ratio A/FTHEX), in accordance with termination of the fuel-cut operation.

With the above configuration, abnormality determination of the air-fuel ratio sensor is executed when the exhaust gas air-fuel ratio changes passing through the theoretical exhaust gas air-fuel ratio in accordance with the start and/or termination of the fuel-cut operation. Accordingly, abnormality determination of the air-fuel ratio sensor is executed when the exhaust gas air-fuel ratio changes a large amount without fail in accordance with the start and/or termination of the fuel-cut operation. Thus, appropriate abnormality determination can be achieved. In addition, as described above, abnormality determination in various exhaust gas air-fuel ratio regions may be integrally performed.

Furthermore, when abnormality determination of the air-fuel ratio sensor is executed at both the start and end of the fuel-cut operation, even if the output characteristics of the air-fuel ratio sensor obtained at the start of the fuel-cut operation are different from those obtained at the end of the fuel-cut operation, abnormalities at the respective times can be individually detected.

The embodiments will now be described with reference to the accompanying drawings, wherein like reference numerals designate corresponding or identical elements throughout the various drawings.

As illustrated in FIG. 1, an abnormality determination device 1 according to the exemplary embodiment of the present invention includes an engine control unit (ECU) 2, and the ECU 2 performs various control processes including the air-fuel ratio control of an internal combustion engine (hereinafter referred to as the "engine") 3. The engine 3 may be, for example, a four-cylinder gasoline engine installed in a motor vehicle (not illustrated). A throttle valve 6 is provided in an intake pipe 4 of the engine 3, and an intake manifold (not illustrated) disposed downstream from the throttle valve 6 has a fuel injection valve (hereinafter referred to as the "injector") 7 for each cylinder. The opening time and the timing of opening and closing of each injector 7 are controlled by the ECU 2, and therefore the quantity of fuel injection QINJ and the timing of fuel injection are controlled accordingly. A catalyst 8 is disposed on the downstream side in an exhaust pipe 5. The catalyst 8 is the three-way catalyst, and cleans carbon monoxide (CO), hydrocarbons (HC), and nitric oxides (NOx) in the exhaust gas by an oxidation-reduction reaction.

Figure 2:
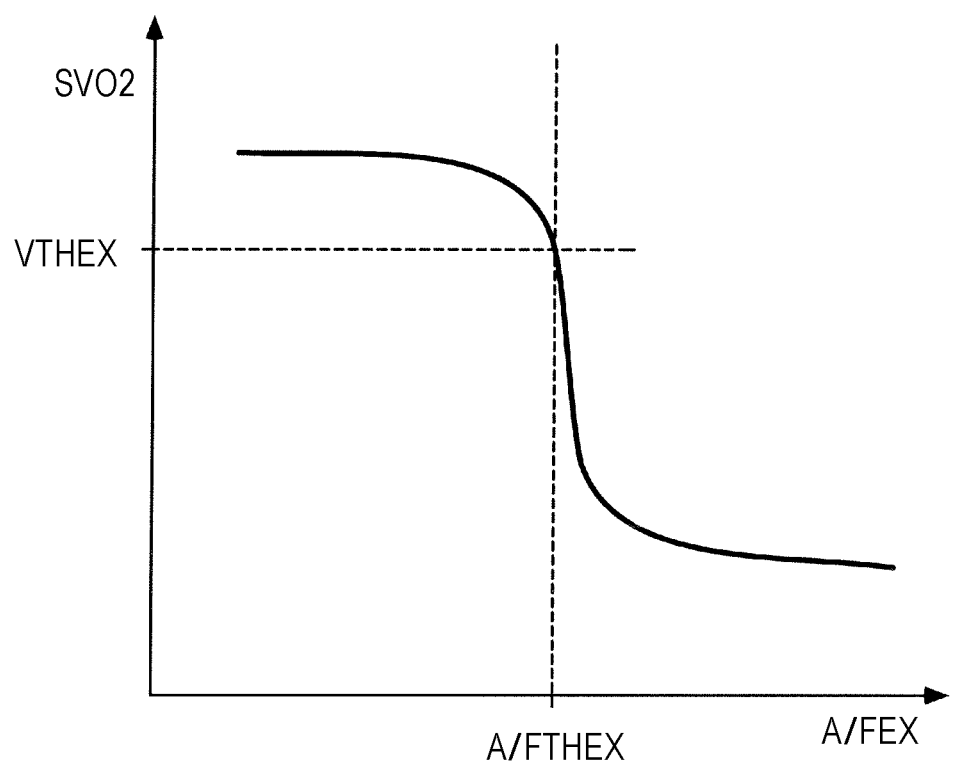
FIG. 2 is a diagram illustrating output characteristics of an oxide concentration sensor.

Further, an oxide concentration sensor (hereinafter referred to as the "O2 sensor") 21 is disposed downstream from the catalyst 8 in the exhaust pipe 5. The O2 sensor 21 detects the concentration of oxide in the exhaust gas downstream from the catalyst 8, and outputs a signal having a voltage corresponding to an exhaust gas air-fuel ratio A/FEX that changes in accordance with the air-fuel ratio of the air-fuel mixture (hereinafter referred to as the "exhaust gas air-fuel ratio A/FEX") to the ECU 2. As illustrated in FIG. 2, the O2 sensor 21 has output characteristics that the voltage value SVO2 of an output signal of the O2 sensor 21 (hereinafter referred to as the "O2 output value SVO2") has a stoichiometric output value VTHEX (for example, 450 mV) with respect to an exhaust gas air-fuel ratio A/FTHEX corresponding to the theoretical air-fuel ratio of the air-fuel mixture (hereinafter referred to as the "theoretical exhaust gas air-fuel ratio A/FTHEX") and rapidly changes before and after the theoretical exhaust gas air-fuel ratio A/FTHEX.

Specifically, the O2 output value SVO2 is a large value (for example, 600 mV) when the exhaust gas air-fuel ratio A/FEX is rich, and a small value (for example, 150 mV) when the exhaust gas air-fuel ratio A/FEX is lean, and rapidly changes therebetween. The rate of change depends upon the exhaust gas air-fuel ratio A/FEX, and becomes maximum when the exhaust gas air-fuel ratio A/FEX is approximately the theoretical exhaust gas air-fuel ratio A/FTHEX. In this example, the rate of change becomes maximum when the exhaust gas air-fuel ratio A/FEX is equal to the value obtained when the O2 output value SVO2 is smaller than the stoichiometric output value VTHEX by 50 mV (=400 mV). Further, a temperature sensor 22 is provided in a detection unit (not illustrated) of the O2 sensor 21. The temperature sensor 22 detects a temperature TSO2 of the detection unit, and outputs a detection signal representing the detected temperature TSO2 to the ECU 2.

Further, an air flow meter 23 is disposed upstream from the throttle valve 6 in the intake pipe 4. The air flow meter 23 detects the mass flow rate GAIR of air passing through the intake pipe 4 (hereinafter referred to as the "intake air amount GAIR"), and outputs a detection signal representing the intake air amount GAIR to the ECU 2.

The ECU 2 may be formed of a microcomputer (not illustrated) including a central processing unit (CPU), a random access memory (RAM), a read-only memory (ROM), and an input/output interface (all of which are not illustrated in the drawings). The ECU 2 executes various computational operations such as air-fuel ratio control based on a control program or the like stored in the ROM in accordance with the detection signals from the sensors 21 to 23 described above. In this embodiment, the ECU 2 corresponds to a differential value calculator and an abnormality determiner.

Figure 3:
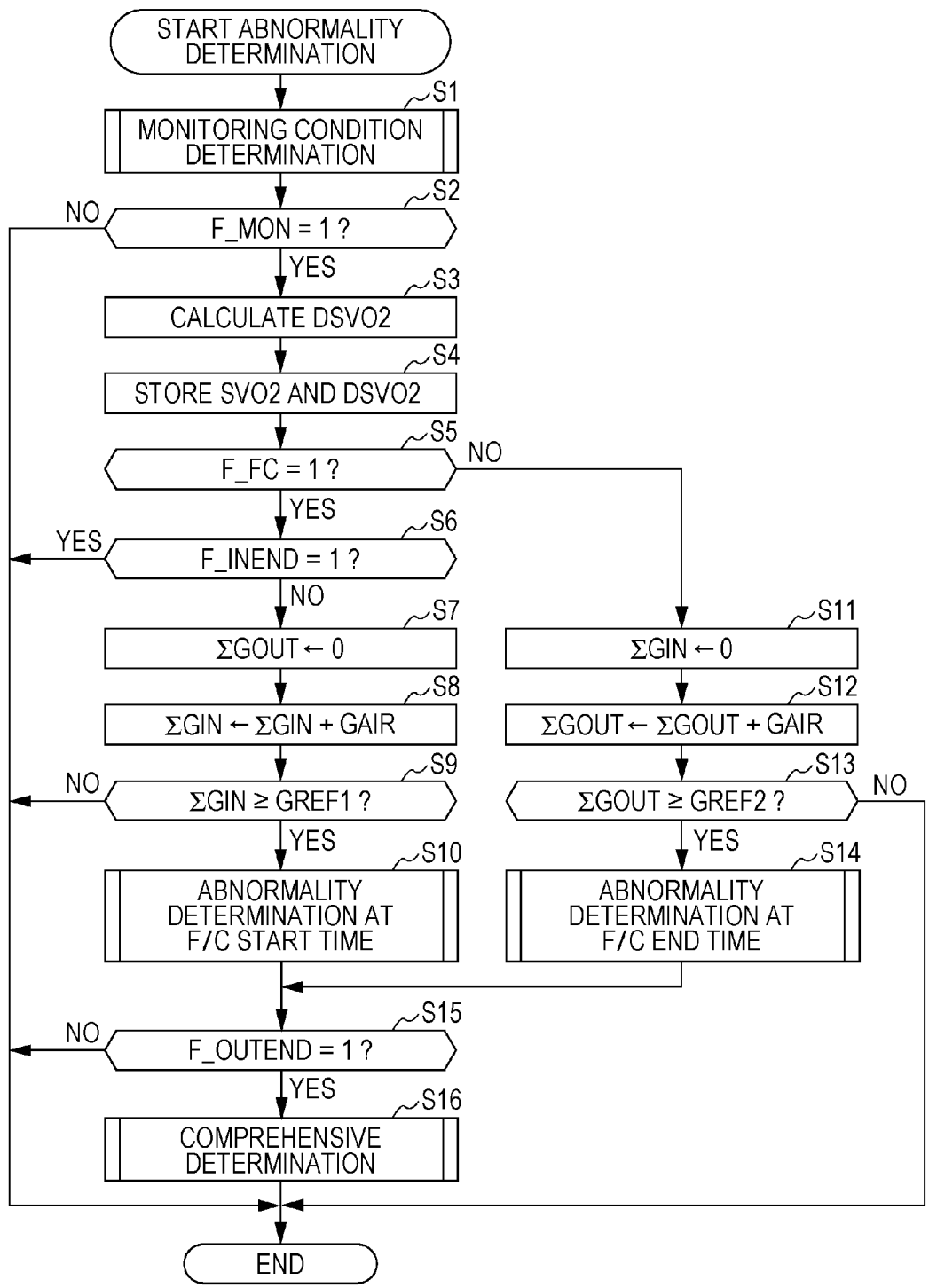
FIG. 3 is a flowchart illustrating an abnormality determination process for the oxide concentration sensor.

Next, the abnormality determination process for the O2 sensor 21, which is executed by the ECU 2, will be described with reference to FIGS. 3 to 13. The abnormality determination process is used to determine whether an abnormality has occurred in the output value SVO2 in accordance with a change in the output characteristics of the O2 sensor 21. FIG. 3 illustrates a main routine of the abnormality determination process, and FIGS. 4 to 13 illustrate sub-routines. Each of the processes in the main routine and the sub-routines is executed every a predetermined time period.

Figure 4:
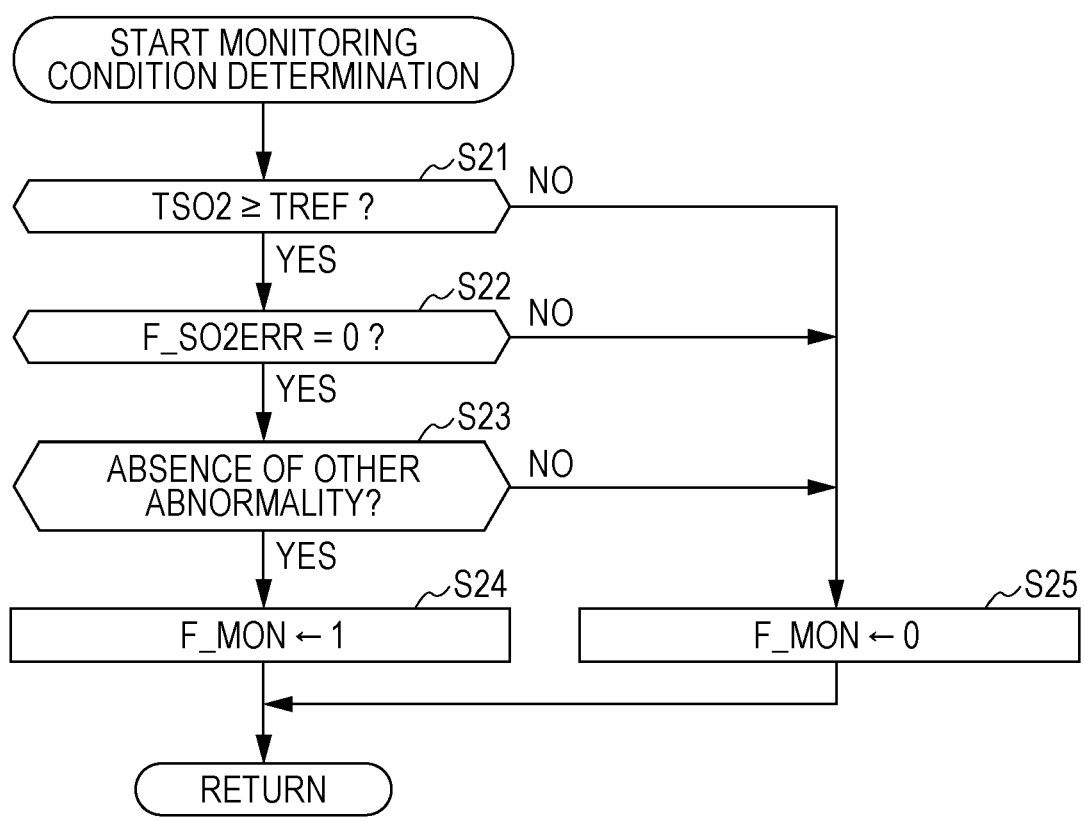
FIG. 4 is a flowchart illustrating a monitoring condition determination process.

In the main routine illustrated in FIG. 3, first, in step 1 (in FIG. 3, "S1"; the same applies to the following steps), a monitoring condition determination process is executed. The monitoring condition determination process is used to determine whether or not the conditions for executing the abnormality determination process for the O2 sensor 21 are met. FIG. 4 illustrates the sub-routine of the monitoring condition determination process.

In this process, first, in steps 21 to 23, it is determined whether or not the following conditions (1) to (3) are satisfied.

(1) The temperature TSO2 of the detection unit of the O2 sensor 21 being higher than or equal to a predetermined temperature TREF.

(2) An O2 sensor abnormality flag F_SO2ERR being "0" (the presence of abnormality of the O2 sensor 21 having not been determined).

(3) Absence of any other abnormality occurring in the O2 sensor 21, such as disconnection, a stagnant output value, or oscillation of the output value.

If all the above conditions (1) to (3) are satisfied, it is determined that the monitoring conditions are satisfied. Then, in step 24, a monitoring condition flag F_MON is set to "1" to indicate that the monitoring conditions are satisfied, and then the process ends. If any one of the above conditions (1) to (3) is not satisfied, it is determined that the monitoring conditions are not satisfied. Then, in step 25, the monitoring condition flag F_MON is set to "0" to indicate that the monitoring conditions are not satisfied, and then the process ends.

Referring back to FIG. 3, in step 2, which immediately follows step 1, it is determined whether or not the monitoring condition flag F_MON is "1". If NO is determined, namely, if the monitoring conditions are not satisfied, the process ends. If YES is determined in step 2, namely, if the monitoring conditions are satisfied, the difference between the current O2 output value SVO2 and the previous O2 output value SVO2 is calculated as an O2 differential value DSVO2 (step 3). In addition, the calculated O2 differential value DSVO2 is stored together with the current O2 output value SVO2 (step 4).

Next, in step 5, it is determined whether or not a fuel-cut flag F_FC is "1". If YES is determined, namely, if the engine 3 is under the fuel-cut operation, then in step 6, it is determined whether or not a fuel-cut (F/C) start-time abnormality determination end flag F_INEND is "1". If YES is determined, namely, if abnormality determination at the start of the fuel-cut operation has already been completed, the process ends.

If NO is determined in step 6, namely, if abnormality determination at the start of the fuel-cut operation has not been completed, then in step 7, an integrated value ΣGOUT of the intake air amount GAIR after the end of the fuel-cut operation (hereinafter referred to as the "end-time intake air amount integrated value ΣGOUT") is reset to 0. Then, in step 8, the intake air amount GAIR is added to an integrated value ΣGIN of up to the previous intake air amount GAIR after the start of the fuel-cut operation to calculate an integrated value ΣGIN of up to the current intake air amount GAIR (hereinafter referred to as the "start-time intake air amount integrated value ΣGIN").

Figure 5:
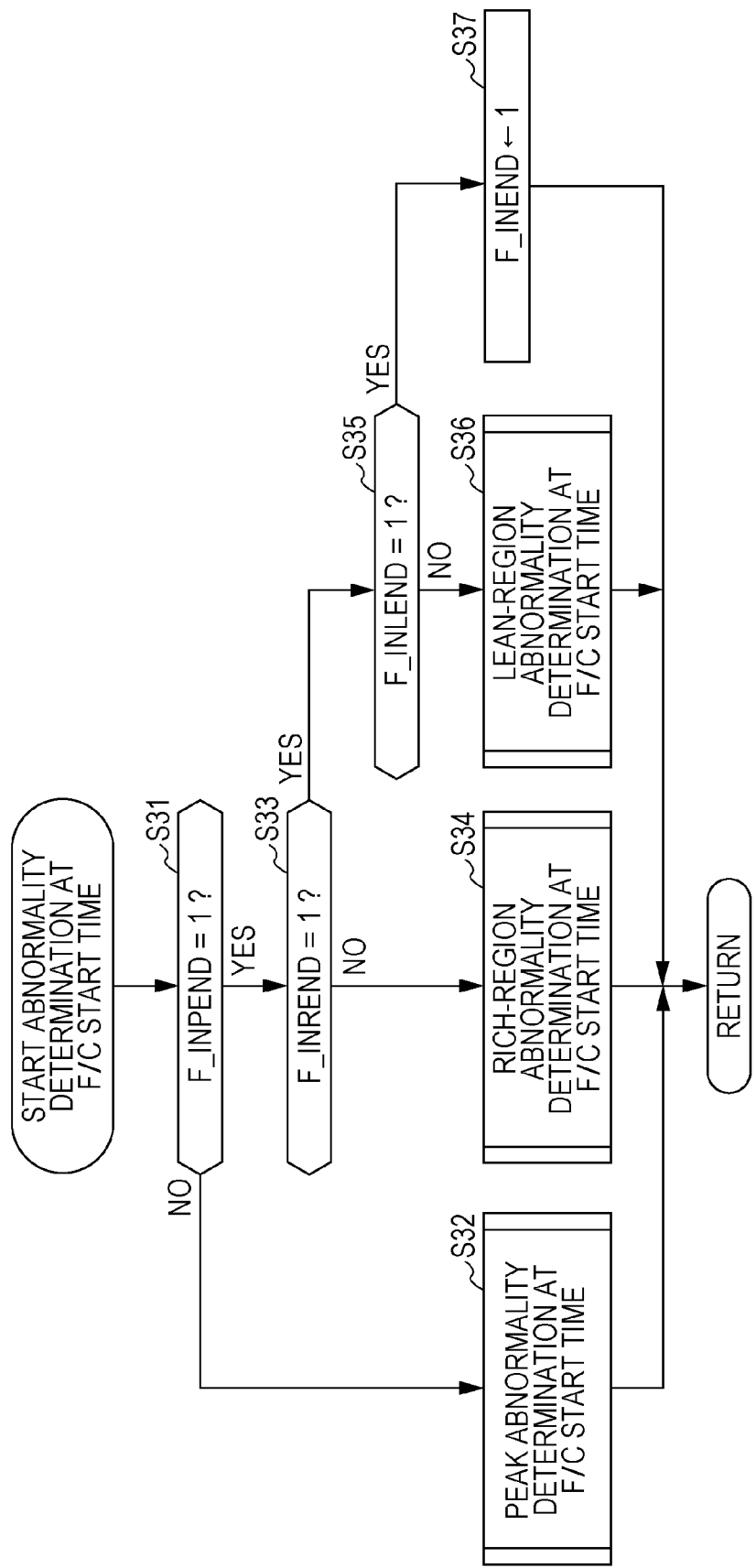
FIG. 5 is a flowchart illustrating an abnormality determination process for an oxide concentration sensor at the start of the fuel-cut operation.

Next, in step 9, it is determined whether or not the calculated start-time intake air amount integrated value ΣGIN larger than or equal to a first predetermined value GREF1. If NO is determined, the process ends. If YES is determined in step 9, it is determined that a sufficient amount of air has been supplied to the engine 3 since the fuel-cut operation was started and that the exhaust gas air-fuel ratio A/FEX has been changed from rich to lean in accordance with the execution of the fuel-cut operation. Then, in step 10, an abnormality determination process at the start of the fuel-cut operation is executed, and then the process proceeds to step 15. The abnormality determination process at the start of the fuel-cut operation is used to determine the abnormality of the O2 sensor 21 using the O2 output value SVO2 and O2 differential value DSVO2 stored in step 4 after the start of the fuel-cut operation. FIG. 5 illustrates the sub-routine of the abnormality determination process at the start of the fuel-cut operation.

Figure 6:
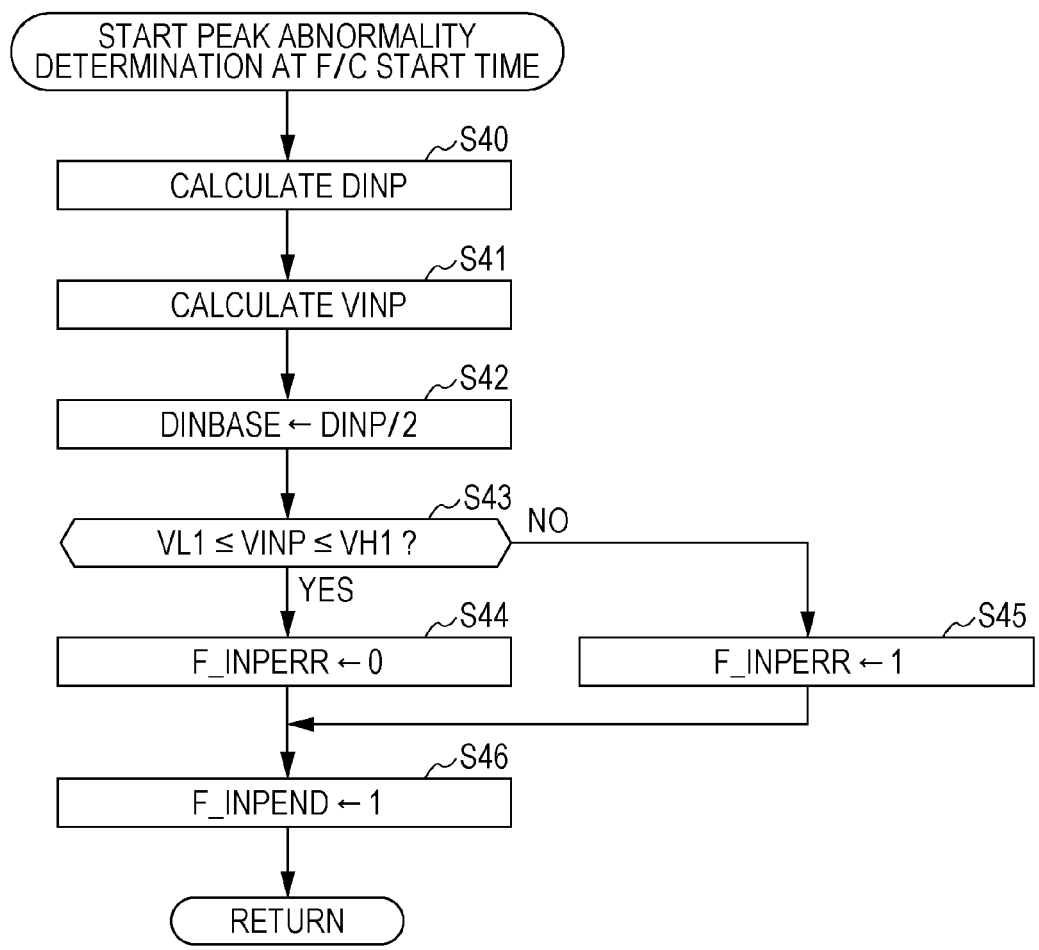
FIG. 6 is a flowchart illustrating a peak abnormality determination process at the start of the fuel-cut operation.

In this process, first, in step 31, it is determined whether or not a start-time peak abnormality determination end flag F_INPEND is "1". If NO is determined, then in step 32, a peak abnormality determination process at the start of the fuel-cut operation is executed, and then the process illustrated in FIG. 5 ends. The peak abnormality determination process is used to determine the abnormality caused by an output characteristic deviation of the O2 sensor 21 around the theoretical exhaust gas air-fuel ratio A/FTHEX. FIG. 6 illustrates the sub-routine of the peak abnormality determination process.

In this process, first, in step 40, a start-time peak differential value DINP is calculated. The start-time peak differential value DINP is a value obtained when the O2 differential value DSVO2 has a local minimum (at the peak time), and is calculated in the following way: First, the time corresponding to a local minimum of the O2 differential values DSVO2 stored during a period from when the fuel-cut operation was started to when the start-time intake air amount integrated value ΣGIN became larger than or equal to the first predetermined value GREF1 (the period will be hereinafter referred to as the "start-time transition period") is determined as a peak time. The peak time is defined as the time when the first control cycle begins when a value obtained by further differentiating an O2 differential value DSVO2 (i.e., the amount of increase in the O2 differential value) becomes positive consecutively three times or more. Then, the O2 differential value DSVO2 obtained at the peak time is calculated as a start-time peak differential value DINP.

Next, in step 41, the O2 output value SVO2 corresponding to the start-time peak differential value DINP is calculated as a start-time peak output value VINP.

As described above, the O2 sensor 21 has an output characteristic that the rate of change of the output value becomes maximum around the theoretical exhaust gas air-fuel ratio A/FTHEX. Thus, when the O2 sensor 21 is operating under normal conditions, the start-time peak differential value DINP and the start-time peak output value VINP are obtained around the theoretical exhaust gas air-fuel ratio A/FTHEX.

Next, in step 42, a start-time basic differential value DINBASE that is half the start-time peak differential value DINP (=DINP/2) is calculated. The start-time basic differential value DINBASE is used for rich-region abnormality determination and lean-region abnormality determination described below.

Next, in step 43, it is determined whether or not the calculated start-time peak output value VINP is larger than or equal to a first lower limit voltage VL1 and is smaller than or equal to a first upper limit voltage VH1. The first lower limit voltage VL1 is set to a value that is smaller than the stoichiometric output value VTHEX by 150 mV (=300 mV), and the first upper limit voltage VH1 is set to a value that is larger than the stoichiometric output value VTHEX by 50 mV (=500 mV). If YES is determined in step 43, namely, if VL1≤VINP≤VH1, it is determined that the output characteristics of the O2 sensor 21 are normal around the theoretical exhaust gas air-fuel ratio A/FTHEX. Then, in step 44, a start-time peak abnormality flag F_INPERR is set to "0" to indicate normal output characteristics, and the process proceeds to step 46.

If NO is determined in step 43, namely, if VINP<VL1 or VINP>VH1, it is determined that an abnormality caused by an output characteristic deviation of the O2 sensor 21 around the theoretical exhaust gas air-fuel ratio A/FTHEX has occurred. Then, in step 45, the start-time peak abnormality flag F_INPERR is set to "1" to indicate the occurrence of the abnormality, and then the process proceeds to step 46.

In step 46, which immediately follows step 44 or step 45, the start-time peak abnormality determination end flag F_INPEND is set to "1" to indicate the completion of the peak abnormality determination process at the start of the fuel-cut operation, and then the process ends.

Figure 7:
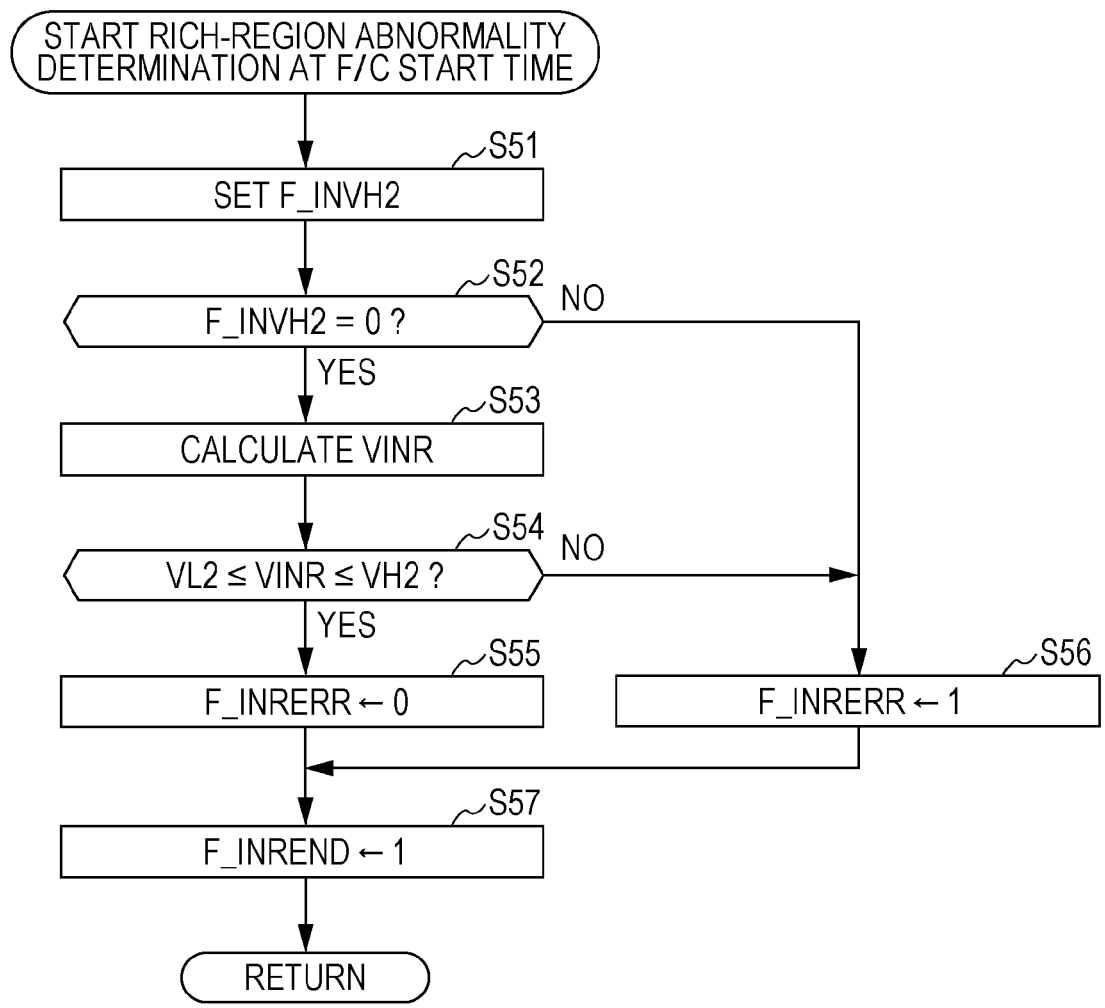
FIG. 7 is a flowchart illustrating a rich-region abnormality determination process at the start of the fuel-cut operation.

Referring back to FIG. 5, if YES is determined in step 31, namely, if the start-time peak abnormality determination end flag F_INPEND is "1", then in step 33, it is determined whether or not a start-time rich abnormality determination end flag F_INREND is "1". If NO is determined, then in step 34, a rich-region abnormality determination process at the start of the fuel-cut operation is executed, and then the process illustrated in FIG. 5 ends. The rich-region abnormality determination process is used to determine the abnormality caused by an output characteristic deviation of the O2 sensor 21 in a rich region with respect to approximately the theoretical exhaust gas air-fuel ratio A/FTHEX. FIG. 7 illustrates the sub-routine of the rich-region abnormality determination process.

In this process, first, in step 51, a start-time upper limit passing flag F_INVH2 is set. Although not illustrated in the drawings, the start-time upper limit passing flag F_INVH2 is set to "0" when the O2 output value SVO2 stored during a period from the beginning of the start-time transition period to the peak time changes from a region larger than a second upper limit voltage VH2 to a region smaller than the second upper limit voltage VH2 across the second upper limit voltage VH2, and is set to "1" otherwise. The second upper limit voltage VH2 is set to a value that is greater than the first upper limit voltage VH1 and that is smaller than the upper limit of the output range of the O2 sensor 21 by 50 mV (=550 mV).

Next, in step 52, it is determined whether or not the start-time upper limit passing flag F_INVH2 is "0". If NO is determined, namely, if the O2 output value SVO2 has not changed from the larger region to the smaller region across the second upper limit voltage VH2, it is determined that an abnormality that the O2 output value SVO2 does not reach the upper limit of the output range has occurred. Then, in step 56, a start-time rich abnormality flag F_INRERR is set to "1", and the process proceeds to step 57.

If YES is determined in step 52, namely, if the O2 output value SVO2 has changed across the second upper limit voltage VH2, it is determined that the O2 output value SVO2 has reached the upper limit of the output range. Then, in step 53, a start-time rich output value VINR is calculated. The start-time rich output value VINR is an O2 output value SVO2 obtained when the O2 differential value DSVO2 exhibits the closest value to the start-time basic differential value DINBASE calculated in step 42 during a period from the beginning of the start-time transition period to the peak time. Specifically, an O2 differential value DSVO2 having the smallest absolute value of the difference from the start-time basic differential value DINBASE (=|DINBASE−DSVO2|) is determined among the O2 differential values DSVO2 stored in step 4 during a period from the beginning of the start-time transition period to the peak time, and the O2 output value SVO2 corresponding to the determined O2 differential value DSVO2 is calculated as a start-time rich output value VINR.

Next, in step 54, it is determined whether or not the calculated start-time rich output value VINR is larger than or equal to a second lower limit voltage VL2 and smaller than or equal to the second upper limit voltage VH2. The second lower limit voltage VL2 is set to a value that is smaller than the first lower limit voltage VL1 and that is larger than the lower limit of the output range of the O2 sensor 21 by 50 mV (=200 mV). If NO is determined in step 54, namely, if VINR<VL2 or VINR>VH2, it is determined that the abnormality caused by an output characteristic deviation of the O2 sensor 21 has occurred in a region between the exhaust gas air-fuel ratio A/FEX corresponding to the second upper limit voltage VH2 and approximately the theoretical exhaust gas air-fuel ratio A/FTHEX. Then, the process proceeds to step 56, and the start-time rich abnormality flag F_INRERR is set to "1".

If YES is determined in step 54, namely, if VL2≤VINR≤VH2, it is determined that the output characteristics of the O2 sensor 21 are normal in the region described above. Additionally, since YES has been determined in step 52, it is determined that the output characteristics of the O2 sensor 21 are normal in the rich region with respect to approximately the theoretical exhaust gas air-fuel ratio A/FTHEX. Then, in step 55, the start-time rich abnormality flag F_INRERR is set to "0" to indicate normal output characteristics, and the process proceeds to step 57.

In step 57, which immediately follows step 55 or step 56, the start-time rich abnormality determination end flag F_IN-REND is set to "1" to indicate the completion of the rich-region abnormality determination process at the start of the fuel-cut operation, and then the process ends.

Figure 8:
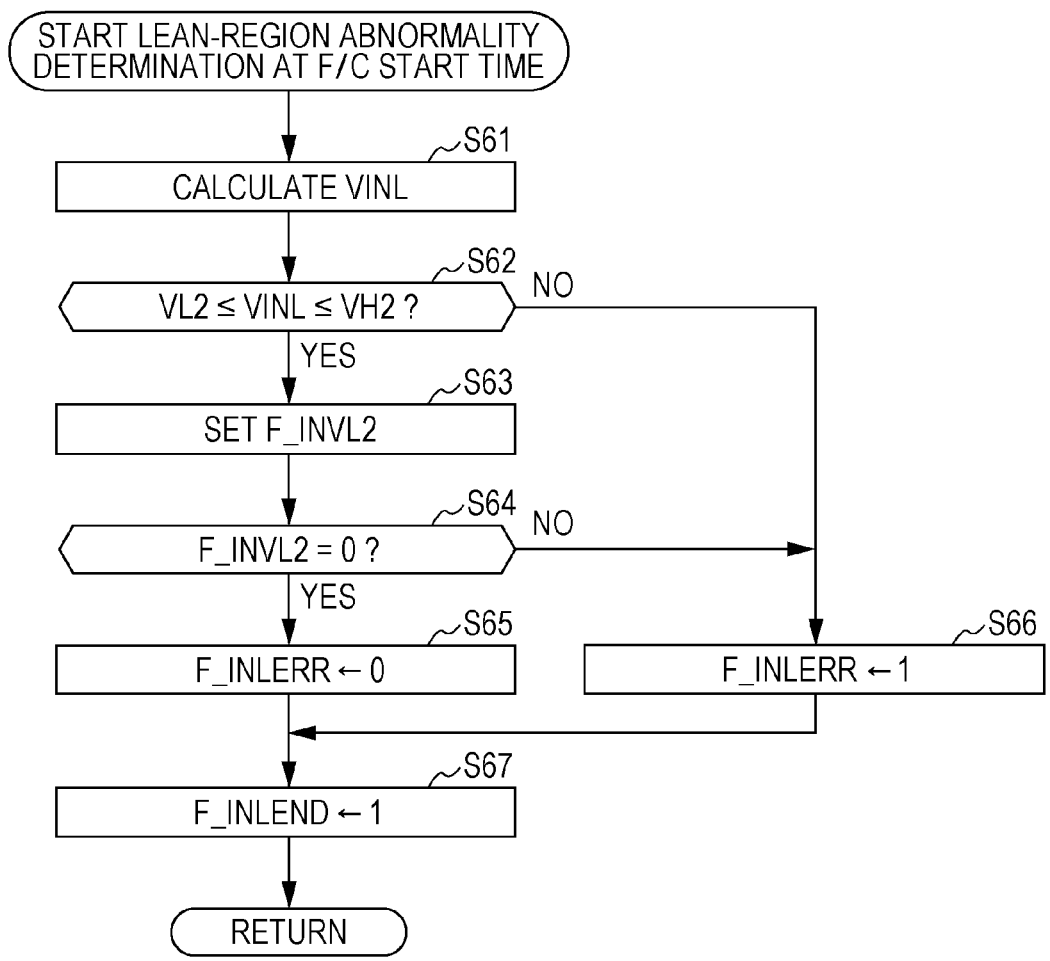
FIG. 8 is a flowchart illustrating a lean-region abnormality determination process at the start of the fuel-cut operation.

Referring back to FIG. 5, if YES is determined in step 33, namely, if the start-time rich abnormality determination end flag F_INREND is "1", then in step 35, it is determined whether or not a start-time lean abnormality determination end flag F_INLEND is "1". If NO is determined, then in step 36, a lean-region abnormality determination process at the start of the fuel-cut operation is executed, and then the process illustrated in FIG. 5 ends. The lean-region abnormality determination process is used to determine the abnormality caused by an output characteristic deviation of the O2 sensor 21 in a lean region with respect to approximately the theoretical exhaust gas air-fuel ratio A/FTHEX. FIG. 8 illustrates the sub-routine of the lean-region abnormality determination process.

In this process, first, in step 61, a start-time lean output value VINL is calculated. The start-time lean output value VINL is an O2 output value SVO2 obtained when the O2 differential value DSVO2 exhibits the closest value to the start-time basic differential value DINBASE during a period from the peak time to the end of the start-time transition period. Specifically, an O2 differential value DSVO2 having the smallest absolute value of the difference from the start-time basic differential value DINBASE is determined among the O2 differential values DSVO2 stored during a period from the peak time to the end of the start-time transition period, and the O2 output value SVO2 corresponding to the determined O2 differential value DSVO2 is calculated as a start-time lean output value VINL.

Next, in step 62, it is determined whether or not the calculated start-time lean output value VINL is larger than or equal to the second lower limit voltage VL2 and is smaller than or equal to the second upper limit voltage VH2. If NO is determined, namely, if VINL<VL2 or VINL>VH2, it is determined that an abnormality caused by an output characteristic deviation of the O2 sensor 21 has occurred in a region between the exhaust gas air-fuel ratio A/FEX corresponding to the second lower limit voltage VL2 and approximately the theoretical exhaust gas air-fuel ratio A/FTHEX. Then, in step 66, a start-time lean abnormality flag F_INLERR is set to "1", and then the process proceeds to step 67.

If YES is determined in step 62, namely, if VL2≤VINL≤VH2, it is determined that the output characteristics of the O2 sensor 21 are normal in the region described above. Then, in step 63, a start-time lower limit passing flag F_INVL2 is set. Although not illustrated in the drawings, the start-time lower limit passing flag F_INVL2 is set to "0" when the O2 output value SVO2 stored during a period from the peak time to the end of the start-time transition period has changed from a region larger than the second lower limit voltage VL2 to a region smaller than the second lower limit voltage VL2 across the second lower limit voltage VL2, and is set to "1" otherwise.

Next, in step 64, it is determined whether or not the start-time lower limit passing flag F_INVL2 is "0". If NO is determined, namely, if the O2 output value SVO2 has not changed from the larger region to the smaller region across the second lower limit voltage VL2, it is determined that an abnormality that the O2 output value SVO2 does not reach the lower limit of the output range has occurred. Then, the process proceeds to step 66, and the start-time lean abnormality flag F_IN-LERR is set to "1".

If YES is determined in step 64, namely, if the O2 output value SVO2 has changed across the second lower limit voltage VL2, it is determined that an O2 output value SVO2 has reached the lower limit of the output range. Additionally, since YES has also been determined in step 62, it is determined that the output characteristics of the O2 sensor 21 are normal in the lean region with respect to approximately the theoretical exhaust gas air-fuel ratio A/FTHEX. Then, in step 65, the start-time lean abnormality flag F_INLERR is set to "0" to indicate normal output characteristics, and the process proceeds to step 67.

In step 67, which immediately follows step 65 or step 66, the start-time lean abnormality determination end flag F_IN-LEND is set to "1" to indicate the completion of the lean-region abnormality determination process at the start of the fuel-cut operation, and then the process ends.

Referring back to FIG. 5, if YES is determined in step 35, namely, if the start-time lean abnormality determination end flag F_INLEND is "1", the series of operations in the abnormality determination process at the start of the fuel-cut operation has been completed. Then, in step 37, the start-time abnormality determination end flag F_INEND is set to "1" to indicate the completion of the series of operations in the abnormality determination process, and then the process ends.

Referring back to FIG. 3, if NO is determined in step 5, namely, if the fuel-cut flag F_FC is "0" and the fuel-cut operation of the engine 3 has been terminated, then in step 11, the start-time intake air amount integrated value ΣGIN is reset to 0. Then, in step 12, the intake air amount GAIR is added to up to the previous end-time intake air amount integrated value ΣGOUT to calculate up to the current end-time intake air amount integrated value ΣGOUT.

Figure 9:
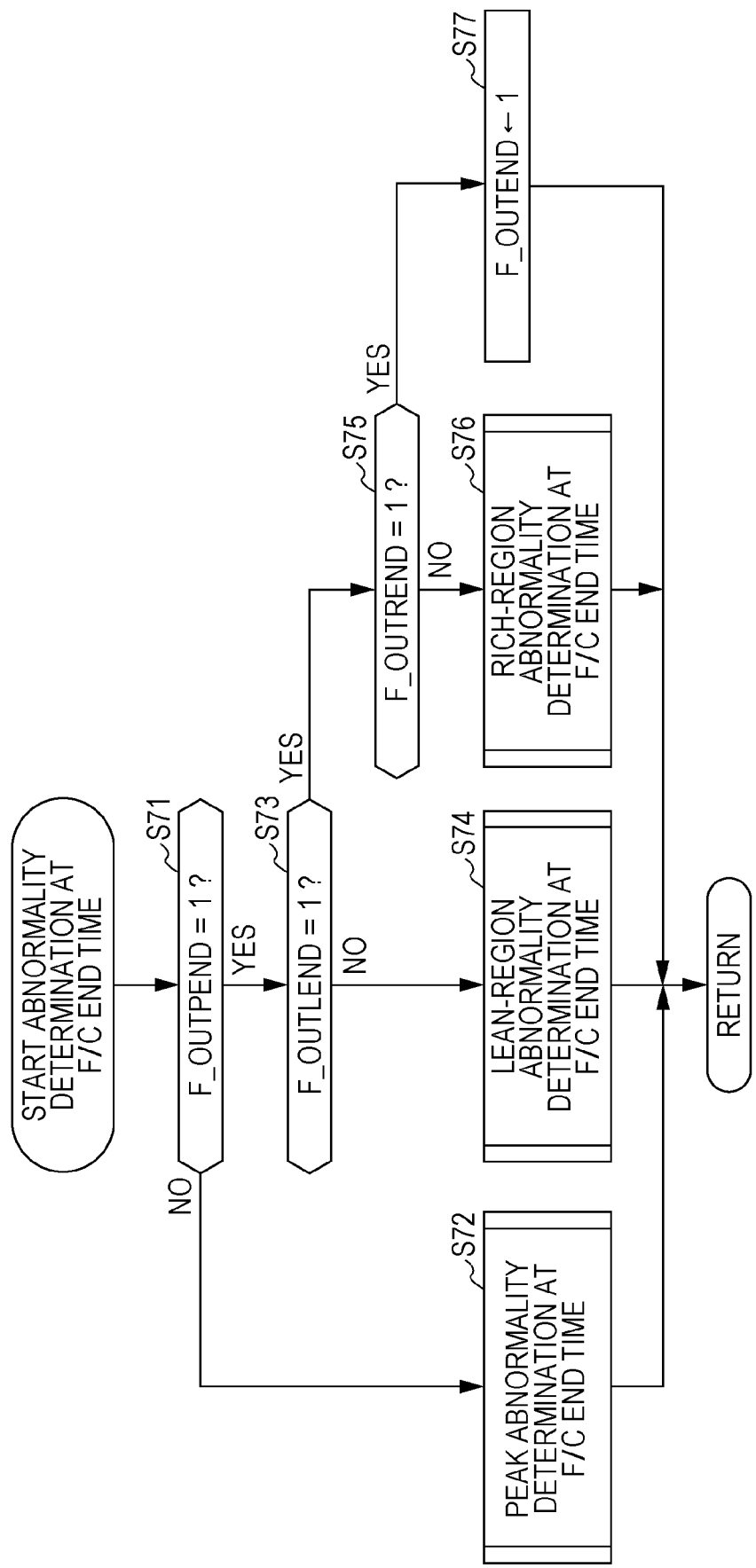
FIG. 9 is a flowchart illustrating an abnormality determination process for an oxide concentration sensor at the end of the fuel-cut operation.

Next, in step 13, it is determined whether or not the calculated end-time intake air amount integrated value ΣGOUT is larger than or equal to a second predetermined value GREF2. If NO is determined, the process ends. If YES is determined in step 13, it is determined that the exhaust gas air-fuel ratio A/FEX has been changed from lean to rich in accordance with the termination of the fuel-cut operation. Then, in step 14, an abnormality determination process at the end of the fuel-cut operation is executed, and then the process proceeds to step 15. The abnormality determination process at the end of the fuel-cut operation is similar to the abnormality determination process at the start of the fuel-cut operation described above. FIG. 9 illustrates the sub-routine of the abnormality determination process at the end of the fuel-cut operation.

Figure 10:
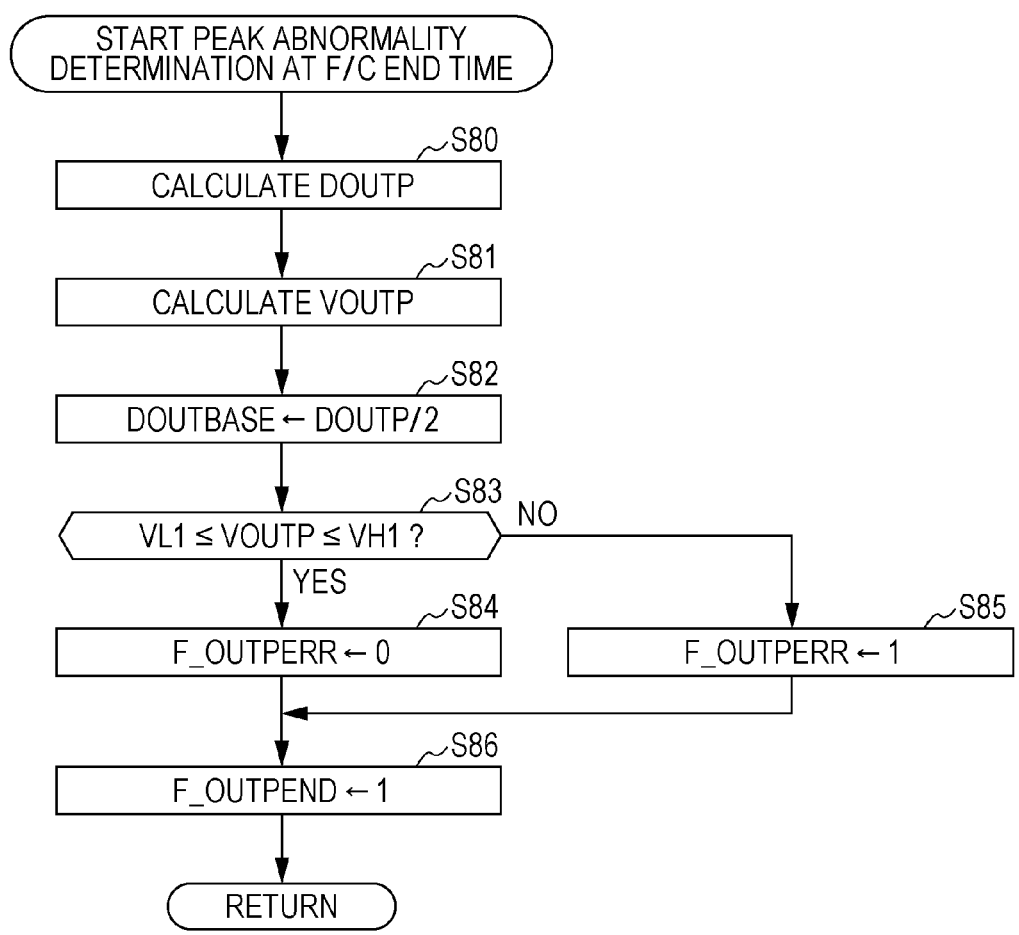
FIG. 10 is a flowchart illustrating a peak abnormality determination process at the end of the fuel-cut operation.

In this process, first, in step 71, it is determined whether or not an end-time peak abnormality determination end flag F_OUTPEND is "1". If NO is determined, then in step 72, a peak abnormality determination process at the end of the fuel-cut operation is executed, and then the process illustrated in FIG. 9 ends. FIG. 10 illustrates the sub-routine of the peak abnormality determination process at the end of the fuel-cut operation.

In this process, first, in step 80, an end-time peak differential value DOUTP is calculated. The end-time peak differential value DOUTP is a value obtained when the O2 differential value DSVO2 exhibits a local maximum (at the peak time), and is calculated in a manner similar to that of the start-time peak differential value DINP described above on the basis of the O2 differential value DSVO2 stored during a period from when the fuel-cut operation was terminated to when the end-time intake air amount integrated value ΣGOUT becomes larger than or equal to the second predetermined GREF2 (the period will be hereinafter referred to as the "end-time transition period").

Next, in step 81, the O2 output value SVO2 corresponding to the end-time peak differential value DOUTP is calculated as an end-time peak output value VOUTP.

Next, in step 82, an end-time basic differential value DOUTBASE that is half the end-time peak differential value DOUTP (=DOUTP/2) is calculated. The end-time basic differential value DOUTBASE is used for rich-region abnormality determination and lean-region abnormality determination described below.

Next, in step 83, it is determined whether or not the calculated end-time peak output value VOUTP is larger than or equal to the first lower limit voltage VL1 and is smaller than or equal to the first upper limit voltage VH1. If YES is determined, namely, if VL1≤VOUTP<VH1, it is determined that the output characteristics of the O2 sensor 21 are normal around the theoretical exhaust gas air-fuel ratio A/FTHEX. Then, in step 84, an end-time peak abnormality flag F_OUTPERR is set to "0" to indicate normal output characteristics, and the process proceeds to step 86.

If NO is determined in step 83, namely, if VOUTP<VL1 or VOUTP>VH1, it is determined that an abnormality caused by an output characteristic deviation of the O2 sensor 21 around the theoretical exhaust gas air-fuel ratio A/FTHEX has occurred. Then, in step 85, the end-time peak abnormality flag F_OUTPERR is set to 1" to indicate that the occurrence of the abnormality, and then the process proceeds to step 86.

In step 86, which immediately follows step 84 or step 85, the end-time peak abnormality determination end flag F_OUTPEND is set to "1" to indicate the completion of the peak abnormality determination process at the end of the fuel-cut operation, and then the process ends.

Figure 11:
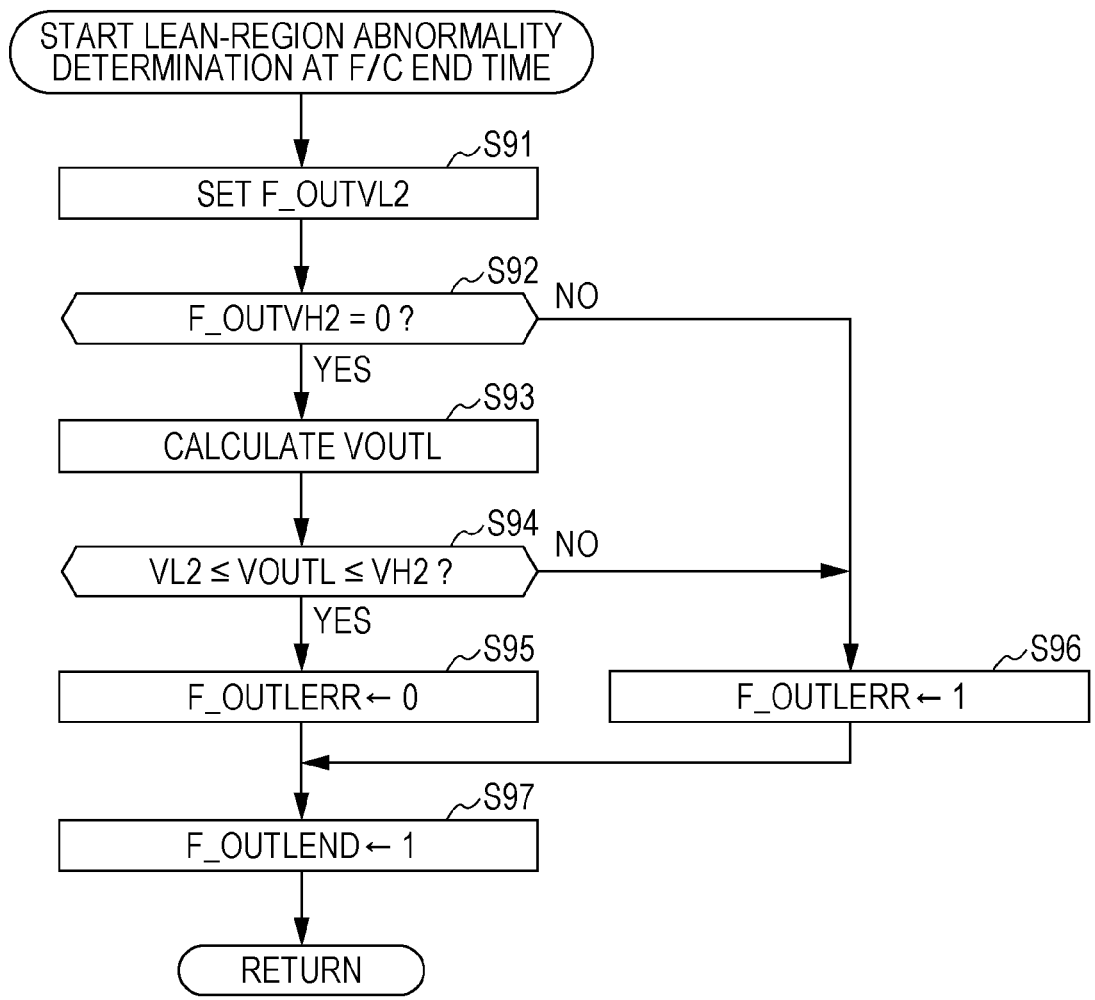
FIG. 11 is a flowchart illustrating a lean-region abnormality determination process at the end of the fuel-cut operation.

Referring back to FIG. 9, if YES is determined in step 71, namely, if the end-time peak abnormality determination end flag F_OUTPEND is "1", then in step 73, it is determined whether or not an end-time lean abnormality determination end flag F_OUTLEND is "1". If NO is determined, then in step 74, a lean-region abnormality determination process at the end of the fuel-cut operation is executed, and then the process illustrated in FIG. 9 ends. FIG. 11 illustrates the sub-routine of the lean-region abnormality determination process at the end of the fuel-cut operation.

In this process, first, in step 91, an end-time lower limit passing flag F_OUTVL2 is set. Although not illustrated in the drawings, the end-time lower limit passing flag F_OUTVL2 is set to "0" when the O2 output value SVO2 has changed from a region smaller than the second lower limit voltage VL2 to a region larger than the second lower limit voltage VL2 across the second lower limit voltage VL2 during a period from the termination of the fuel-cut operation to the peak time, and is set to "1" otherwise.

Next, in step 92, it is determined whether or not the end-time lower limit passing flag F_OUTVL2 is "0". If NO is determined, namely, if the O2 output value SVO2 has not changed from the smaller region to the larger region across the second lower limit voltage VL2, it is determined that an abnormality that the O2 output value SVO2 does not reach the lower limit of the output range has occurred. Then, in step 96, an end-time lean abnormality flag F_OUTLERR is set to "1", and the process proceeds to step 97.

If YES is determined in step 92, namely, if the O2 output value SVO2 has changed across the second lower limit voltage VH2, it is determined that the O2 output value SVO2 has reached the lower limit of the output range. Then, in step 93, an end-time lean output value VOUTL is calculated. The end-time lean output value VOUTL is an O2 output value SVO2 obtained when the O2 differential value DSVO2 exhibits the closest value to the end-time basic differential value DOUTBASE calculated in step 82 during a period from the beginning of the end-time transition period to the peak time, and is calculated using a method similar to that of the start-time rich output value VINR described above.

Next, in step 94, it is determined whether or not the calculated end-time lean output value VOUTL is larger than or equal to the second lower limit voltage VL2 and is smaller than or equal to the second upper limit voltage VH2. If NO is determined, namely, if VOUTL<VL2 or VOUTL>VH2, it is determined that an abnormality caused by an output characteristic deviation of the O2 sensor 21 has occurred in a region between the exhaust gas air-fuel ratio A/FEX corresponding to the second lower limit voltage VL2 and approximately the theoretical exhaust gas air-fuel ratio A/FTHEX. Then, the process proceeds to step 96, and the end-time lean abnormality flag F_OUTLERR is set to "1".

If YES is determined in step 94, namely, if VL2≤VOUTL≤VH2, it is determined that the output characteristics of the O2 sensor 21 are normal in the region described above. Additionally, since YES has also been determined in step 92, it is determined that the output characteristics of the O2 sensor 21 are normal in the lean region with respect to approximately the theoretical exhaust gas air-fuel ratio A/FTHEX. Then, in step 95, the end-time lean abnormality flag F_OUTLERR is set to "0" to indicate normal output characteristics, and the process proceeds to step 97.

In step 97, which immediately follows step 95 or step 96, the end-time lean abnormality determination end flag F_OUTLEND is set to "1" to indicate the completion of the lean-region abnormality determination process at the end of the fuel-cut operation, and then the process ends.

Figure 12:
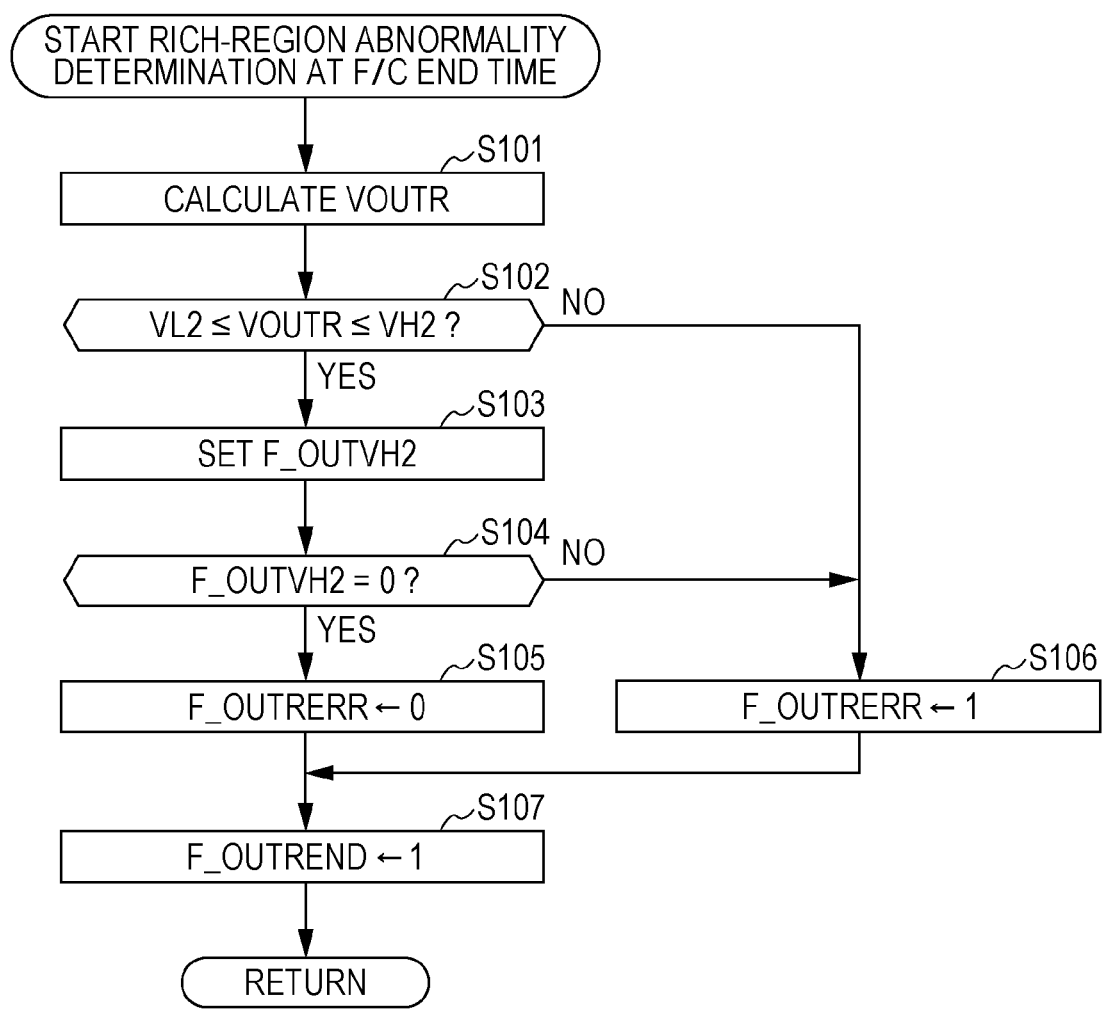
FIG. 12 is a flowchart illustrating a rich-region abnormality determination process at the end of the fuel-cut operation.

Referring back to FIG. 9, if YES is determined in step 73, namely, if the end-time lean abnormality determination end flag F_OUTLEND is "1", then in step 75, it is determined whether or not an end-time rich abnormality determination end flag F_OUTREND is "1". If NO is determined, then in step 76, a rich-region abnormality determination process at the end of the fuel-cut operation is executed, and then the process illustrated in FIG. 9 ends. FIG. 12 illustrates the sub-routine of the rich-region abnormality determination process at the end of the fuel-cut operation.

In this process, first, in step 101, an end-time rich output value VOUTR is calculated. The end-time rich output value VOUTR is an O2 output value SVO2 obtained when the O2 differential value DSVO2 exhibits the closest value to the end-time basic differential value DOUTBASE during a period from the peak time to the end of the end-time transition period, and is calculated using a method similar to that of the start-time lean output value VINL described above.

Next, in step 102, it is determined whether or not the calculated end-time rich output value VOUTR is larger than or equal to the second lower limit voltage VL2 and is smaller than or equal to the second upper limit voltage VH2. If NO is determined, namely, if VOUTR<VL2 or VOUTR>VH2, it is determined that an abnormality caused by an output characteristic deviation of the O2 sensor 21 has occurred in a region between the exhaust gas air-fuel ratio A/FEX corresponding to the second upper limit voltage VH2 and approximately the theoretical exhaust gas air-fuel ratio A/FTHEX. Then, in step 106, an end-time rich abnormality flag F_OUTRERR is set to "1", and then the process proceeds to step 107.

If YES is determined in step 102, namely, if VL2≤VOUTR≤VH2, then in step 103, an end-time upper limit passing flag F_OUTVH2 is set. Although not illustrated in the drawings, the end-time upper limit passing flag F_OUTVH2 is set to "0" when the O2 output value SVO2 stored during a period from the peak time to the end of the end-time transition period has changed from a region smaller than the second upper limit voltage VH2 to a region larger than the second upper limit voltage VH2 across the second upper limit voltage VH2, and is set to "1" otherwise.

Next, in step 104, it is determined whether or not the end-time upper limit passing flag F_OUTVH2 is "0". If NO is determined, namely, if the O2 output value SVO2 has not changed from the smaller region to the larger region across the second upper limit voltage VH2, it is determined that an abnormality that the O2 output value SVO2 does not reach the upper limit of the output range has occurred. Then, the process proceeds to step 106, and the end-time rich abnormality flag F_OUTRERR is set to "1".

If YES is determined in step 104, namely, if the O2 output value SVO2 has changed across the second upper limit voltage VH2, it is determined that an O2 output value SVO2 has reached the upper limit of the output range. Additionally, since YES has also been determined in step 102, it is determined that the output characteristics of the O2 sensor 21 are normal in the rich region with respect to approximately the theoretical exhaust gas air-fuel ratio A/FTHEX. Then, in step 105, the end-time rich abnormality flag F_OUTRERR is set to "0" to indicate normal output characteristics, and the process proceeds to step 107.

In step 107, which immediately follows step 105 or step 106, the end-time rich abnormality determination end flag F_OUTREND is set to "1" to indicate the completion of the rich-region abnormality determination process at the end of the fuel-cut operation, and then the process ends.

Referring back to FIG. 9, if YES is determined in step 75, namely, if the end-time rich abnormality determination end flag F_OUTREND is "1", the series of operations in the abnormality determination process at the end of the fuel-cut operation has been completed. Then, in step 77, an end-time abnormality determination end flag F_OUTEND is set to "1" to indicate the completion of the series of operations in the abnormality determination process at the end of the fuel-cut operation, and then the process ends.

Figure 13:
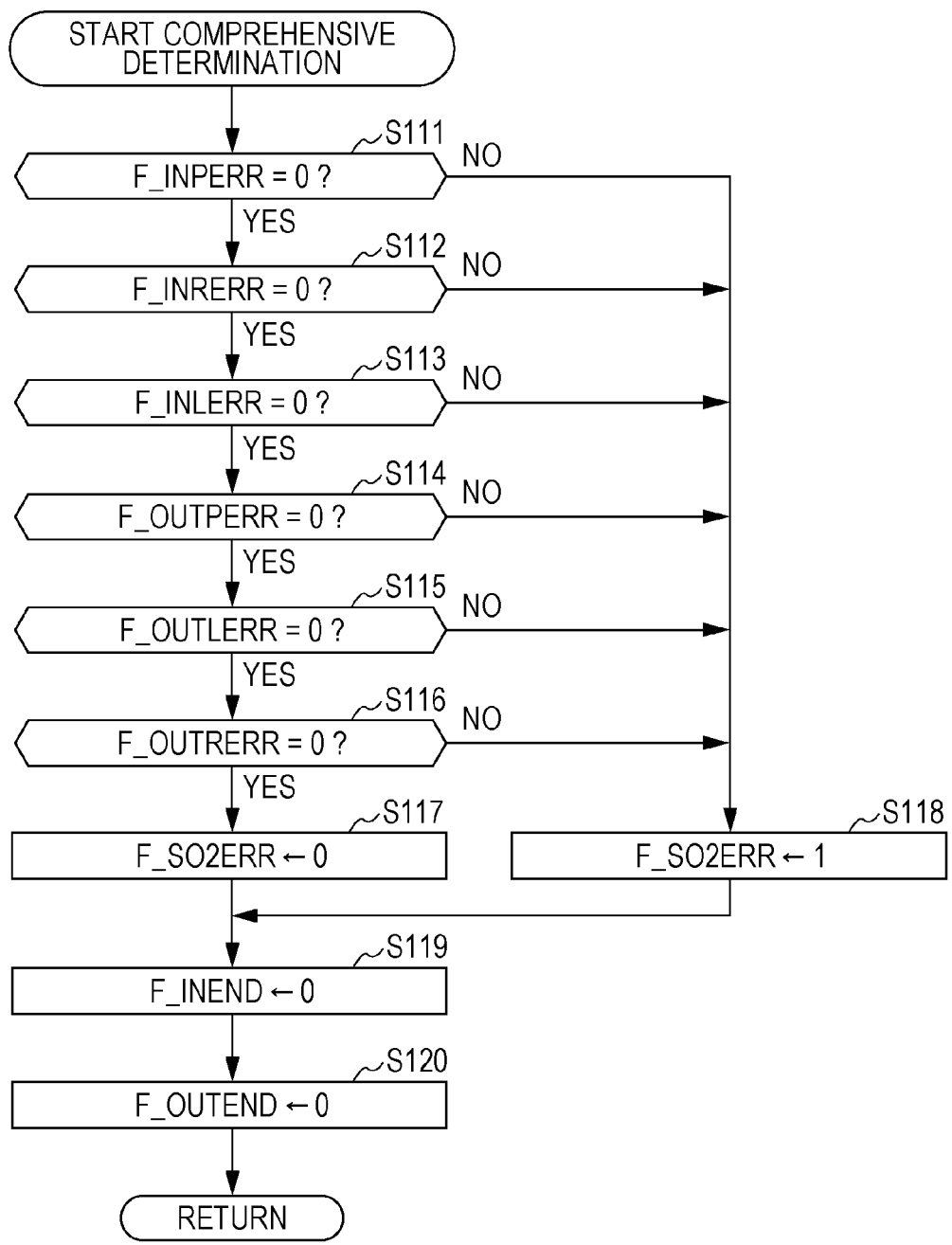
FIG. 13 is a flowchart illustrating a comprehensive determination process.

Referring back to FIG. 3, in step 15, which follows step 10 or step 14, it is determined whether or not the end-time abnormality determination end flag F_OUTEND is "1". If NO is determined, the process ends. If YES is determined in step 15, namely, if the abnormality determination process at the end of the fuel-cut operation has been completed, then in step 16, a comprehensive determination process is executed, and then the process illustrated in FIG. 3 ends. The comprehensive determination process is used to comprehensively determine the abnormality of the O2 sensor 21 using the abnormality flags set in the various abnormality determination operations described above. FIG. 13 illustrates the subroutine of the comprehensive determination process.

In this process, first, in steps 111 to 116, it is determined whether or not the following conditions (1) to (6) are satisfied.
 (1) Start-time peak abnormality flag F_INPERR=0
 (2) Start-time rich abnormality flag F_INRERR=0
 (3) Start-time lean abnormality flag F_INLERR=0
 (4) End-time peak abnormality flag F_OUTPERR=0
 (5) End-time lean abnormality flag F_OUTLERR=0
 (6) End-time rich abnormality flag F_OUTRERR=0

If all the above conditions (1) to (6) are satisfied, it is determined that the O2 sensor 21 is operating under normal conditions. Then, in step 117, the O2 sensor abnormality flag F_SO2ERR is set to "0" to indicate that the O2 sensor 21 is operating under normal conditions, and then the process proceeds to step 119. If any one of the above conditions (1) to (6) is not satisfied, it is determined that an abnormality has occurred in the O2 sensor 21. Then, in step 118, the O2 sensor abnormality flag F_SO2ERR is set to "1" to indicate the occurrence of the abnormality, and then the process proceeds to step 119.

In step 119, which immediately follows step 117 or step 118, and in step 120, both the start-time abnormality determination end flag F_INEND and the end-time abnormality determination end flag F_OUTEND are set to "0", respectively, and then the process ends.

Next, an example of results determined by the abnormality determination processes described above will be described with reference to FIGS. 14A to 14F and FIGS. 15 to 18, by taking the abnormality determination process at the start of the fuel-cut operation as an example. FIGS. 14A to 14F illustrate the output characteristics of the O2 sensor 21 in which an abnormality has occurred (indicated by thin lines), in abnormality patterns, together with the output characteristics of the O2 sensor 21 under normal conditions (indicated by thick lines), and FIGS. 15 to 18 illustrate changes of the respective parameters in accordance with the start of the fuel-cut operation.

Figure 15:
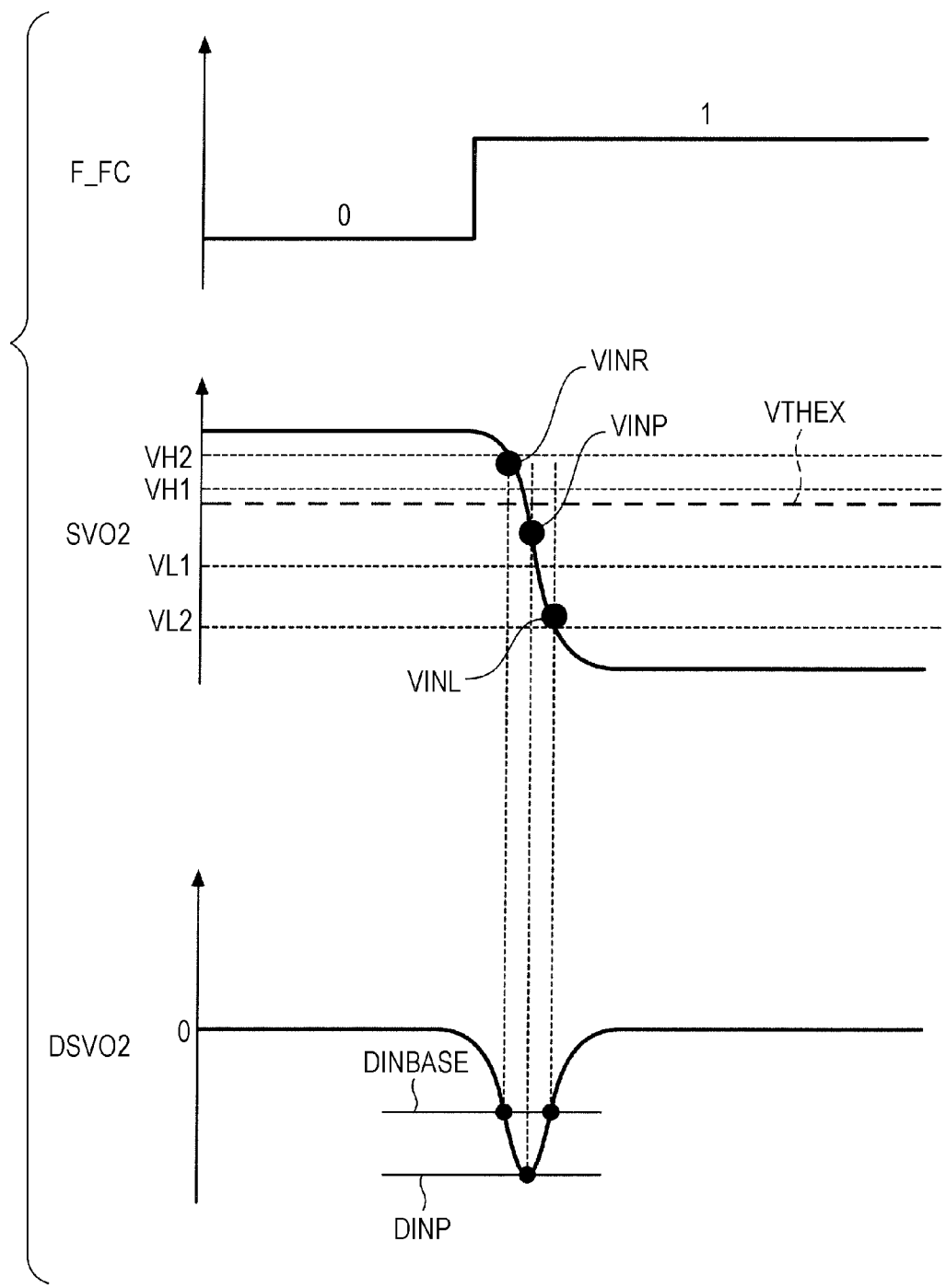
FIG. 15 is a diagram illustrating a change in respective parameters in accordance with the start of the fuel-cut operation when the oxide concentration sensor is operating under normal conditions.

As illustrated in FIG. 15, when the O2 sensor 21 is operating under normal conditions, before the fuel-cut operation is started (F_FC=0), the O2 output value SVO2 is kept substantially constant at a value larger than the second upper limit VH2 and therefore the O2 differential value DSVO2 is 0. When the fuel-cut flag F_FC is set to "1" and the fuel-cut operation is started, the O2 output value SVO2 decreases in accordance with the output characteristics of the O2 sensor 21, and is finally kept substantially constant at a value smaller than the second lower limit VL2. During the above period, the O2 differential value DSVO2 decreases to the start-time peak differential value DINP around the theoretical exhaust gas air-fuel ratio A/FTHEX in accordance with the output characteristics of the O2 sensor 21, and is thereafter increased to 0.

As illustrated in FIG. 15, the O2 output value SVO2 changes across the second upper limit VH2 and the second lower limit VL2. The start-time peak output value VINP is between the first upper limit VH1 and the first lower limit VL1, and the start-time rich output value VINR and the start-time lean output value VINL are between the second upper limit VH2 and the second lower limit VL2.

Therefore, when the O2 sensor 21 is operating under normal conditions, as illustrated in FIG. 19, all the start-time upper limit passing flag F_INVH2, the start-time peak abnormality flag F_INPERR, the start-time rich abnormality flag F_INRERR, the start-time lean abnormality flag F_INLERR, and the start-time lower limit passing flag F_INVL2 are set to "0". As a consequence, in the comprehensive determination illustrated in FIG. 13, it is determined that the O2 sensor 21 is operating under normal conditions.

Figure 16:
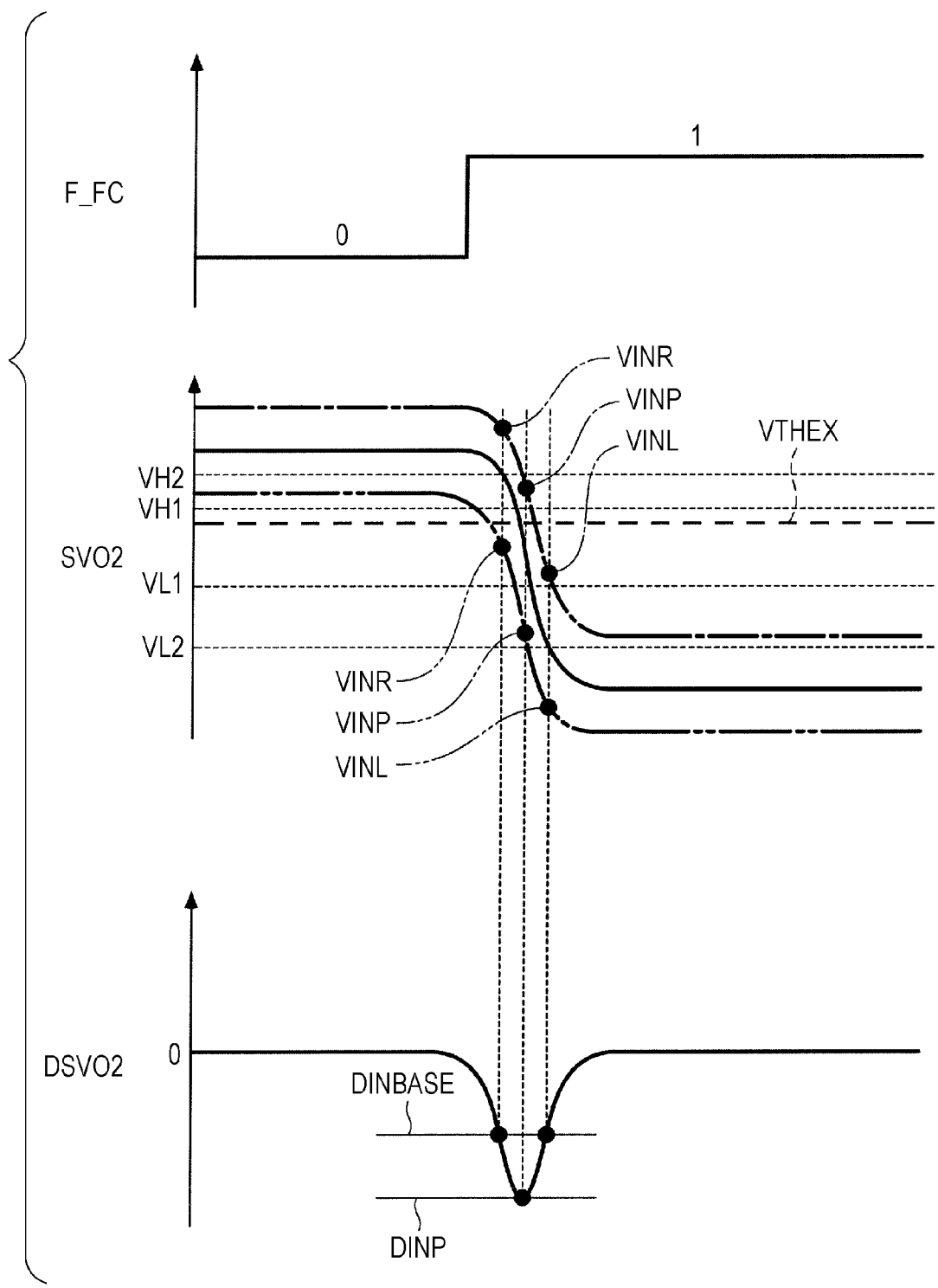
FIG. 16 is a diagram illustrating a change in respective parameters in accordance with the start of the fuel-cut operation when a rich-side/lean-side offset abnormality has occurred in the oxide concentration sensor.

In contrast, as indicated by the thin line in FIG. 14A, in the occurrence of an abnormality that the O2 output value SVO2 is entirely offset to the increase side (hereinafter referred to as the "rich-side offset"), as indicated by the one-dot dashed line in FIG. 16, the behavior of the O2 differential value DSVO2 is substantially the same as that obtained when the O2 sensor 21 is operating under normal conditions, and therefore the start-time peak differential value DINP and the start-time basic differential value DINBASE are substantially the same as those under normal conditions.

Meanwhile, the O2 output value SVO2 changes across the second upper limit VH2 but not across the second lower limit VL2, and stays above (or larger than) the second lower limit VL2. In addition, while the start-time lean output value VINL is between the second upper limit VH2 and the second lower limit VL2, the start-time peak output value VINP is above (or larger than) the first upper limit VH1 and the start-time rich output value VINR is above the second upper limit VH2.

Therefore, in the occurrence of the rich-side offset, as represented by (a) in FIG. 19, the start-time upper limit passing flag F_INVH2 is set to "0", and the start-time peak abnormality flag F_INPERR, the start-time rich abnormality flag F_INRERR, the start-time lean abnormality flag F_INLERR, and the start-time lower limit passing flag F_INVL2 are all set to "1". As a consequence, in the comprehensive determination illustrated in FIG. 13, it is determined that an abnormality has occurred in the O2 sensor 21.

Further, as indicated by the thin line in FIG. 14B, in the occurrence of an abnormality that the O2 output value SVO2 is entirely offset to the decrease side (hereinafter referred to as the "lean-side offset"), as indicated by the two-dot dashed line in FIG. 16, the behavior of the O2 differential value DSVO2 is substantially the same as that obtained when the O2 sensor 21 is operating under normal conditions, and therefore the start-time peak differential value DINP and the start-time basic differential value DINBASE are substantially the same as those under normal conditions.

Meanwhile, the O2 output value SVO2 changes across the second lower limit VL2 but not across the second upper limit VH2, and stays below (or smaller than) the second upper limit VH2. In addition, while the start-time rich output value VINR is between the second upper limit VH2 and the second lower limit VL2, the start-time peak output value VINP is below (or smaller than) the first upper limit VH1 and the start-time lean output value VINL is below the second lower limit VL2.

Therefore, in the occurrence of the lean-side offset, as represented by (b) in FIG. 19, the start-time lower limit passing flag F_INVL2 is set to "0", and the start-time upper limit passing flag F_INVH2, the start-time peak abnormality flag F_INPERR, the start-time rich abnormality flag F_INRERR, and the start-time lean abnormality flag F_INLERR are all set to "1". As a consequence, in the comprehensive determination illustrated in FIG. 13, it is determined that an abnormality has occurred in the O2 sensor 21.

Figure 17:
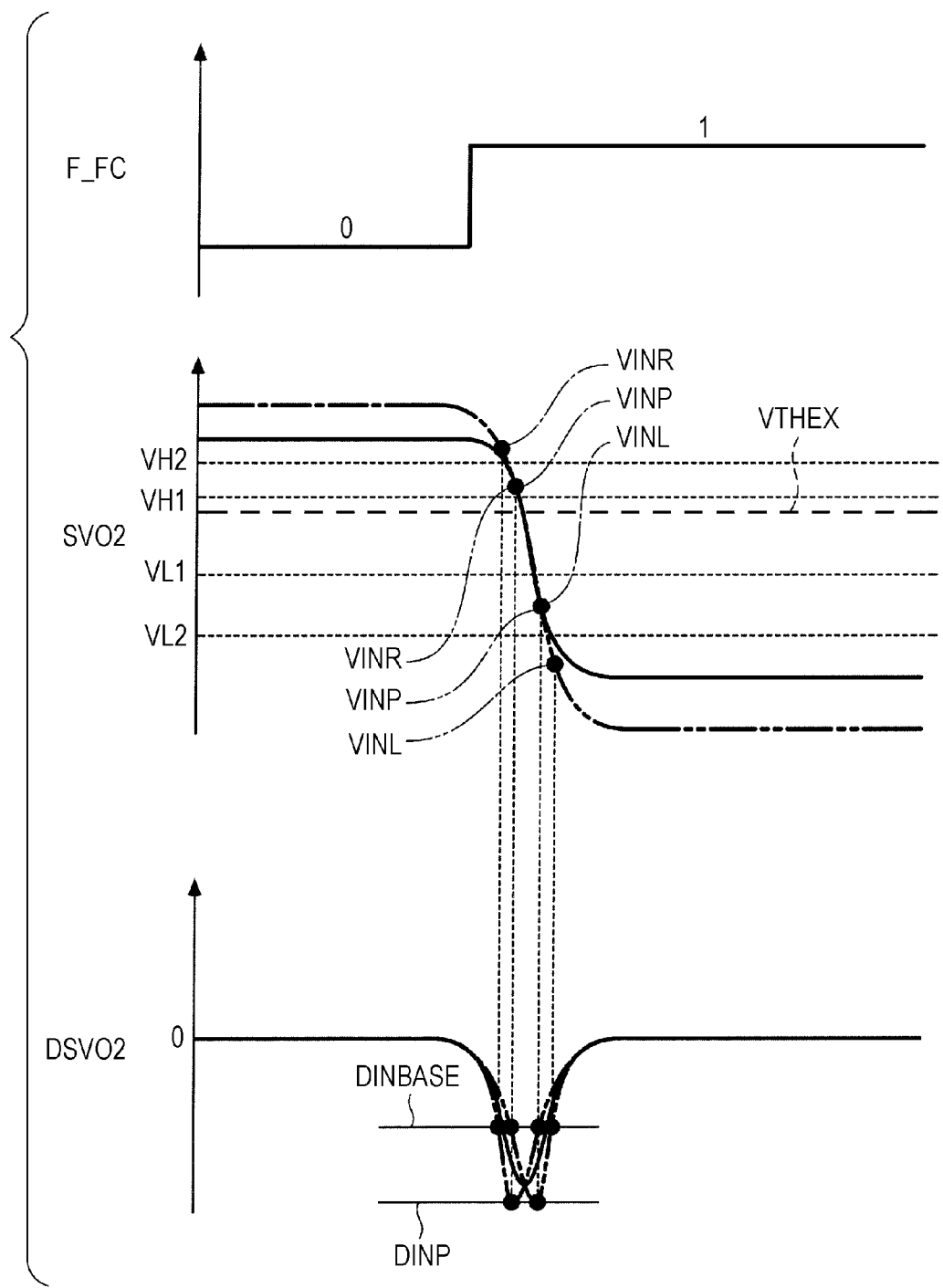
FIG. 17 is a diagram illustrating a change in respective parameters in accordance with the start of the fuel-cut operation when a rich-only/lean-only offset abnormality has occurred in the oxide concentration sensor.

Further, as indicated by the thin line in FIG. 14C, in the occurrence of an abnormality that the O2 output value SVO2 is offset to the increase side in the output range on the rich side with respect to approximately the theoretical exhaust gas air-fuel ratio A/FTHEX (hereinafter referred to as the "rich-only offset"), as indicated by the one-dot dashed line in FIG. 17, a peak position of the O2 differential value DSVO2 is shifted to the rich side, compared to that when the O2 sensor 21 is operating under normal conditions. In this case, the start-time peak differential value DINP becomes smaller (i.e., the O2 differential value DSVO2 changes a larger amount), and therefore the start-time basic differential value DINBASE also becomes smaller.

Meanwhile, the O2 output value SVO2 changes across the second upper limit VH2 and the second lower limit VL2. While the start-time lean output value VINL is between the second upper limit VH2 and the second lower limit VL2, the start-time peak output value VINP is above the first upper limit VH1 and the start-time rich output value VINR is above the second upper limit VH2.

Therefore, in the occurrence of the rich-only offset, as represented by (c) in FIG. 19, the start-time upper limit passing flag F_INVH2, the start-time lean abnormality flag F_INRERR, and the start-time lower limit passing flag F_INVL2 are all set to "0", and the start-time rich abnormality flag F_INRERR and the start-time peak abnormality flag F_INPERR are all set to "1". As a consequence, in the comprehensive determination illustrated in FIG. 13, it is determined that an abnormality has occurred in the O2 sensor 21.

Further, as indicated by the thin line in FIG. 14D, in the occurrence of an abnormality that the O2 output value SVO2 is offset to the decrease side in the output range on the lean condition with respect to approximately the theoretical exhaust gas air-fuel ratio A/FTHEX (hereinafter referred to as the "lean-only offset"), as indicated by the two-dot dashed line in FIG. 17, a peak position of the O2 differential value DSVO2 is shifted to the lean side, compared to that when the O2 sensor 21 is operating under normal conditions. In this case, the start-time peak differential value DINP becomes smaller (i.e., the O2 differential value DSVO2 changes a larger amount), and therefore the start-time basic differential value DINBASE also becomes smaller.

Meanwhile, the O2 output value SVO2 changes across the second upper limit VH2 and the second lower limit VL2. While the start-time rich output value VINR is between the second upper limit VH2 and the second lower limit VL2, the start-time peak output value VINP is below the first lower limit VL1 and the start-time lean output value VINL is below the second lower limit VL2.

Therefore, in the occurrence of the lean-only offset, as represented by (d) in FIG. 19, the start-time upper limit passing flag F_INVH2, the start-time rich abnormality flag F_INRERR, and the start-time lower limit passing flag F_INVL2 are all set to "0", and the start-time peak abnormality flag F_INPERR and the start-time lean abnormality flag F_INLERR are all set to "1". As a consequence, in the comprehensive determination illustrated in FIG. 13, it is determined that an abnormality has occurred in the O2 sensor 21.

Figure 18:
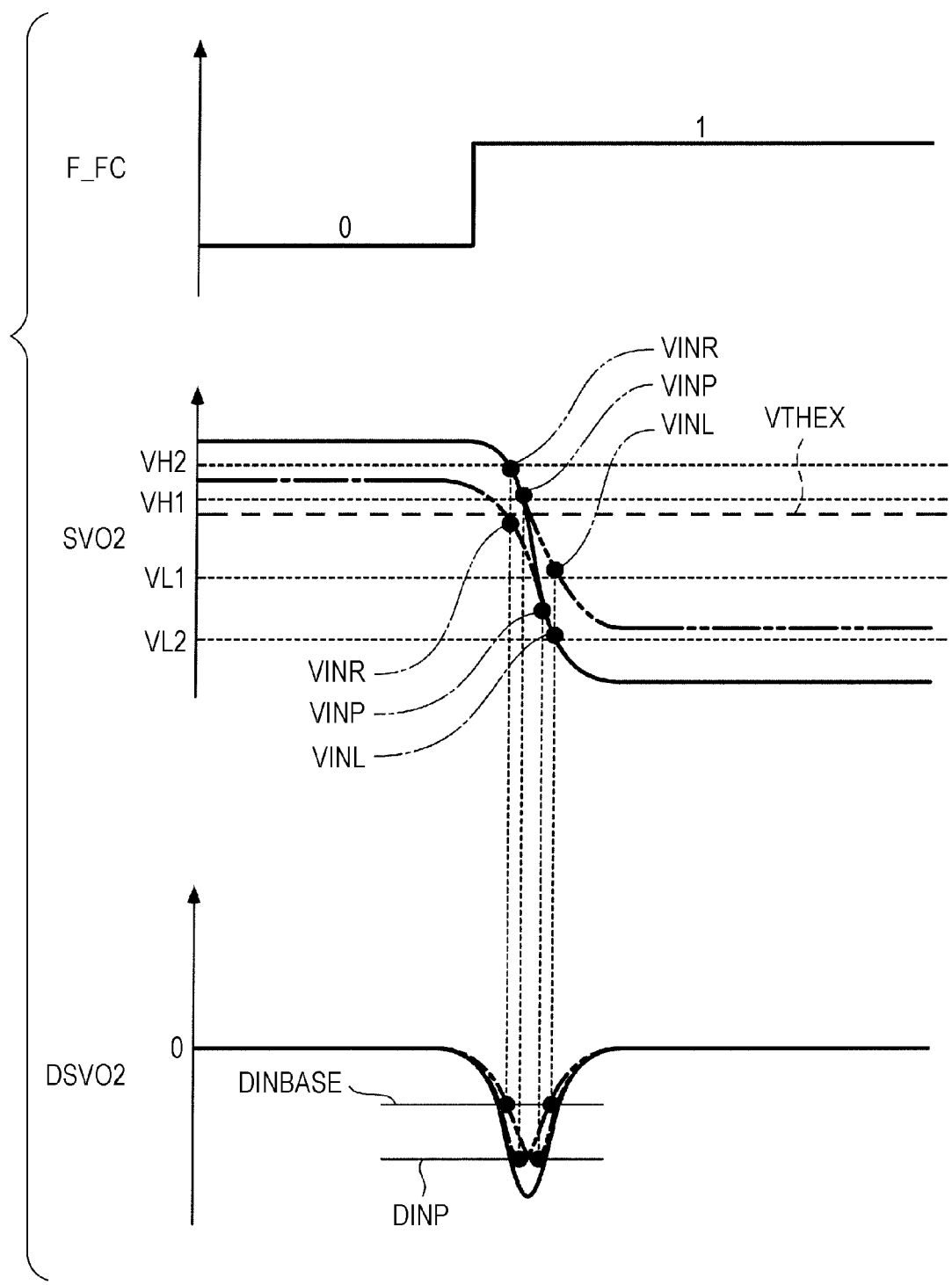
FIG. 18 is a diagram illustrating a change in respective parameters in accordance with the start of the fuel-cut operation when a rich/lean distortion abnormality has occurred in the oxide concentration sensor.

Further, as indicated by the thin line in FIG. 14E, in the occurrence of an abnormality that the O2 output value SVO2 is offset to the decrease side in the output range on the rich side with respect to approximately the theoretical exhaust gas air-fuel ratio A/FTHEX (hereinafter referred to as the "rich distortion"), as indicated by the one-dot dashed line in FIG. 18, a peak position of the O2 differential value DSVO2 is shifted to the lean side, compared to that when the O2 sensor 21 is operating under normal conditions. In this case, the start-time peak differential value DINP becomes larger (i.e., the O2 differential value DSVO2 changes a smaller amount), and therefore the start-time basic differential value DINBASE also becomes larger.

Meanwhile, the O2 output value SVO2 changes across the second lower limit VL2 but not across the second upper limit VH2, and stays below (or smaller than) the second upper limit VH2. In addition, while the start-time rich output value VINR and the start-time lean output value VINL are between the second upper limit VH2 and the second lower limit VL2, the start-time peak output value VINP is below the first lower limit VL1.

Therefore, in the occurrence of the rich distortion, as represented by (e) in FIG. 19, the start-time lean abnormality flag F_INLERR and the start-time lower limit passing flag F_INVL2 are all set to "0", and the start-time upper limit passing flag F_INVH2, the start-time rich abnormality flag F_INRERR, and the start-time peak abnormality flag F_IN-PERR are all set to "1". As a consequence, in the comprehensive determination illustrated in FIG. 13, it is determined that an abnormality has occurred in the O2 sensor 21.

Further, as indicated by the thin line in FIG. 14F, in the occurrence of an abnormality that the O2 output value SVO2 is offset to the increase side in the output range on the lean side with respect to approximately the theoretical exhaust gas air-fuel ratio A/FTHEX (hereinafter referred to as the "lean distortion"), as indicated by the two-dot dashed line in FIG. 18, a peak position of the O2 differential value DSVO2 is shifted to the rich side, compared to that when the O2 sensor 21 is operating under normal conditions. In this case, the start-time peak differential value DINP becomes larger (i.e., the O2 differential value DSVO2 changes a smaller amount), and therefore the start-time basic differential value DIN-BASE also becomes larger.

Meanwhile, the O2 output value SVO2 changes across the second upper limit VH2 but not across the second lower limit VL2, and stays above (or larger than) the second lower limit VL2. In addition, while the start-time rich output value VINR and the start-time lean output value VINL are between the second upper limit VH2 and the second lower limit VL2, the start-time peak output value VINP is below the first upper limit VH1.

Therefore, in the occurrence of the lean distortion, as represented by (f) in FIG. 19, the start-time upper limit passing flag F_INVH2 and the start-time rich abnormality flag F_IN-RERR are all set to "0", and the start-time peak abnormality flag F_INPERR, the start-time lean abnormality flag F_IN-LERR, and the start-time lower limit passing flag F_INVL2 are all set to "1". As a consequence, in the comprehensive determination illustrated in FIG. 13, it is determined that an abnormality has occurred in the O2 sensor 21.

Consequently, as illustrated in FIG. 19, the values of the five flags are used in different combinations depending on the abnormality pattern of the O2 sensor 21. Therefore, an abnormality pattern can be specified on the basis of the combination of the values of the five flags.

According to this embodiment, therefore, whether an abnormality has occurred in the O2 sensor 21 is determined by using the O2 output value SVO2 obtained when the O2 differential value DSVO2 becomes a predetermined value (the start-time peak differential value DINP, the start-time basic differential value DINBASE, the end-time peak differential value DOUTP, the end-time basic differential value DOUTBASE). Thus, even if an abnormality that the O2 differential value DSVO2 does not change, such as the rich-side offset or lean-side offset, has occurred in the O2 sensor 21, an output characteristic deviation can be detected and the occurrence of abnormality in the O2 sensor 21 can be appropriately determined.

Furthermore, since whether an abnormality has occurred in the O2 sensor 21 is determined in accordance with whether or not each of the start-time peak output value VINP and the end-time peak output value VOUTP is between the first upper limit VH1 and the first lower limit VL1, an abnormality caused by an output characteristic deviation of the O2 sensor 21 around the theoretical exhaust gas air-fuel ratio A/FTHEX can be appropriately detected. Additionally, since the start-time peak differential value DINP is a local minimum of the O2 differential value DSVO2 and the end-time peak differential value DOUTP is a local maximum of the O2 differential value DSVO2, the reference points that abnormality determination is based on can be more clearly identified. Thus, appropriate abnormality determination of the O2 sensor 21 can be achieved.

Furthermore, whether an abnormality has occurred in the O2 sensor 21 is determined in accordance with whether or not each of the start-time rich output value VINR, the start-time lean output value VINL, the end-time lean output value VOUTL, and the end-time rich output value VOUTR is between the first upper limit VH1 and the first lower limit VL1. Thus, the presence of abnormality of the O2 sensor 21 in the rich and lean regions with respect to approximately the theoretical exhaust gas air-fuel ratio A/FTHEX can be appropriately determined.

Moreover, whether an abnormality has occurred in the O2 sensor 21 is determined in accordance with whether or not the O2 output value SVO2 has changed across the second upper limit VH2 and the second lower limit VL2. Thus, the presence of abnormality of the O2 sensor 21 in the region of the exhaust gas air-fuel ratio A/FEX corresponding to approximately the upper limit and lower limit of the output range of the O2 sensor 21 can be appropriately determined.

Furthermore, as described above, abnormality determination is performed for various regions of the exhaust gas air-fuel ratio A/FEX. Thus, the presence of abnormality of the O2 sensor 21 in a broad region of the exhaust gas air-fuel ratio A/FEX can be appropriately determined in an integral and comprehensive manner.

Moreover, abnormality determination of the O2 sensor 21 is executed at both the start and end of the fuel-cut operation. Thus, even if the output characteristics of the O2 sensor 21 obtained at the start of the fuel-cut operation are different from those obtained at the end of the fuel-cut operation, an abnormality occurring in the O2 sensor 21 can be detected.

The present invention is not to be limited to the foregoing embodiment, and a variety of embodiments may be contemplated. For example, in the foregoing embodiment, a value that is half the start-time peak differential value DINP is used as the start-time basic differential value DINBASE. However, the start-time basic differential value DINBASE may be a value between 0 and the start-time peak differential value DINP, and may be a value uncorrelated with the start-time peak differential value DINP or a fixed value. The same applies to the end-time basic differential value DOUTBASE.

In the foregoing embodiment, whether an abnormality has occurred in the O2 sensor 21 is determined after the F/C start-time (end-time) transition period has elapsed and after the changes in the exhaust gas air-fuel ratio A/FEX in accordance with the start (termination) of the fuel-cut operation have been completed. However, the present invention is not limited to the above embodiment, and whether an abnormality has occurred in the O2 sensor 21 may be determined at the start (end) of the fuel-cut operation in real time by using the O2 output value SVO2 and the O2 differential value DSVO2 which are obtained at that time. Alternatively, the abnormality determination process at the start of the fuel-cut operation and the abnormality determination process at the end of the fuel-cut operation may be performed collectively after the termination of the fuel-cut operation.

In the foregoing embodiment, furthermore, the same first upper limit VH1, second upper limit VH2, first lower limit VL1, and second lower limit VL2 are used at both the start and end of the fuel-cut operation. However, different first upper limits VH1, second upper limits VH2, first lower limits VL1, and second lower limits VL2 may used at the start and end of the fuel-cut operation.

Moreover, the second upper limit and the second lower limit used for rich-region abnormality determination and lean-region abnormality determination, and the second upper limit and the second lower limit used for the setting of the upper limit (lower limit) passing flag are set to the same values (i.e., the second upper limit VH2 and the second lower limit VL2, respectively), and are commonly used. However, different second upper limits and second lower limits may be used. For example, the second upper limit used for the setting of the start-time upper limit passing flag F_INVH2 and the end-time upper limit passing flag F_OUTVH2 may be set to a value larger than the upper limit of the output range of the O2 sensor 21, and/or the second lower limit used for the setting of the start-time lower limit passing flag F_INVL2 and the end-time lower limit passing flag F_OUTVL2 may be set to a value smaller than the lower limit of the output range of the O2 sensor 21. In addition, the presence of an abnormality may be determined when the O2 output value SVO2 has passed through the second upper limit and/or the second lower limit.

While in the foregoing embodiment, abnormality determination of the O2 sensor 21 is executed at both the start and end of the fuel-cut operation, abnormality determination of the O2 sensor 21 may be executed at either start or end of the fuel-cut operation. Furthermore, while in the foregoing embodiment, the O2 sensor 21 is disposed downstream from the catalyst 8, the O2 sensor 21 may be disposed upstream from the catalyst 8.

In the above embodiment, the abnormality determination device is applied to a gasoline engine installed in a motor vehicle. However, the present invention is not limited to the above embodiment, and the abnormality determination device may also be applied to various engines other than gasoline engines, such as diesel engines, or to engines in vehicles other than motor vehicles, such as marine engines including outboard engines in which a crank shaft is vertically disposed. It is to be understood that the present invention is not limited to the exact configuration discussed herein and a variety of modifications and changes can be made without departing from the scope of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. An abnormality determination device for an air-fuel ratio sensor, comprising:
a differential value calculator configured to calculate a differential value of an output value of the air-fuel ratio sensor which is configured to detect an air-fuel ratio of exhaust gas; and
an abnormality determiner configured to determine abnormality of the air-fuel ratio sensor based on a result of comparison between a reference output value of the air-fuel ratio sensor and a predetermined threshold, the reference output value being obtained by the air-fuel ratio sensor when the differential value calculated by the differential value calculator becomes a predetermined value, wherein
the abnormality determiner determines abnormality of the air-fuel ratio sensor when the air-fuel ratio of the exhaust gas changes from rich to lean with respect to a theoretical exhaust gas air-fuel ratio which is an exhaust gas air-fuel ratio corresponding to a theoretical air-fuel ratio of air-fuel mixture, passing through the theoretical exhaust gas air-fuel ratio, in accordance with at least one of start and termination of a fuel-cut operation that stops supply of fuel to an internal combustion engine.

2. An abnormality determination device for an air-fuel ratio sensor, comprising:
a differential value calculator configured to calculate a differential value of an output air-fuel ratio value of the air-fuel ratio sensor which is configured to detect an air-fuel ratio of exhaust gas;
the air-fuel ratio sensor being configured to obtain the output air-fuel ratio value of the air-fuel ratio sensor as a reference output air-fuel ratio value at a time when the differential value calculated by the differential value calculator becomes a predetermined differential value; and
an abnormality determiner configured to determine abnormality of the air-fuel ratio sensor based on a result of comparison between the reference output air-fuel ratio value of the air-fuel ratio sensor and a predetermined threshold output air-fuel ratio value.

3. An abnormality determination device for an air-fuel ratio sensor, comprising:
a differential value calculator configured to calculate a differential value of an output value of the air-fuel ratio sensor which is configured to detect an air-fuel ratio of exhaust gas; and
an abnormality determiner configured to determine abnormality of the air-fuel ratio sensor based on a result of comparison between a reference output value of the air-fuel ratio sensor and a predetermined threshold, the reference output value being obtained by the air-fuel ratio sensor when the differential value calculated by the differential value calculator becomes a predetermined value, wherein
the predetermined threshold includes a fifth threshold set to at least one of an approximately upper limit and an approximately lower limit of an output range of the air-fuel ratio sensor, and
the abnormality determiner is configured to determine abnormality of the air-fuel ratio sensor in accordance with whether or not the output value of the air-fuel ratio sensor has changed across the fifth threshold.

4. The abnormality determination device according to claim 3, wherein
the abnormality determiner determines abnormality of the air-fuel ratio sensor when the air-fuel ratio of the exhaust gas changes from rich to lean with respect to a theoretical exhaust gas air-fuel ratio which is an exhaust gas air-fuel ratio corresponding to a theoretical air-fuel ratio of air-fuel mixture, passing through the theoretical exhaust gas air-fuel ratio, in accordance with at least one of start and termination of a fuel-cut operation that stops supply of fuel to an internal combustion engine.

5. An abnormality determination device for an air-fuel ratio sensor, comprising:
a differential value calculator configured to calculate a differential value of an output value of the air-fuel ratio sensor which is configured to detect an air-fuel ratio of exhaust gas; and
an abnormality determiner configured to determine abnormality of the air-fuel ratio sensor based on a result of comparison between a reference output value of the air-fuel ratio sensor and a predetermined threshold, the reference output value being obtained by the air-fuel ratio sensor when the differential value calculated by the differential value calculator becomes a predetermined value, wherein the air-fuel ratio sensor has an output characteristic that a rate of change of the air-fuel ratio of the exhaust gas becomes maximum around a theoretical exhaust gas air-fuel ratio which is an exhaust gas air-fuel ratio corresponding to a theoretical air-fuel ratio of air-fuel mixture, the predetermined value includes a value between 0 and a local extremum of the differential value, the predetermined threshold includes a third threshold and a fourth threshold, and the abnormality determiner is configured to determine abnormality of the air-fuel ratio sensor in accordance with whether or not the reference output value of the air-fuel ratio sensor is between the third threshold and the fourth threshold.

6. The abnormality determination device according to claim 5, wherein the abnormality determiner determines abnormality of the air-fuel ratio sensor when the air-fuel ratio of the exhaust gas changes from rich to lean with respect to a theoretical exhaust gas air-fuel ratio which is an exhaust gas air-fuel ratio corresponding to a theoretical air-fuel ratio of air-fuel mixture, passing through the theoretical exhaust gas air-fuel ratio, in accordance with at least one of start and termination of a fuel-cut operation that stops supply of fuel to an internal combustion engine.

7. The abnormality determination device according to claim 5, wherein the abnormality determiner determines that an output value of the air-fuel ratio sensor is normal if the reference output value of the air-fuel ratio sensor is between the third threshold and the fourth threshold, and the abnormality determiner determines that abnormality of the air-fuel ratio sensor has occurred if the reference output value of the air-fuel ratio sensor is greater than the third threshold or smaller than the fourth threshold.

8. The abnormality determination device according to claim 5, wherein the predetermined threshold includes a fifth threshold set to at least one of an approximately upper limit and an approximately lower limit of an output range of the air-fuel ratio sensor, and the abnormality determiner is configured to determine abnormality of the air-fuel ratio sensor in accordance with whether or not the output value of the air-fuel ratio sensor has changed across the fifth threshold.

9. The abnormality determination device according to claim 8, wherein the abnormality determiner determines abnormality of the air-fuel ratio sensor when the air-fuel ratio of the exhaust gas changes from rich to lean with respect to a theoretical exhaust gas air-fuel ratio which is an exhaust gas air-fuel ratio corresponding to a theoretical air-fuel ratio of air-fuel mixture, passing through the theoretical exhaust gas air-fuel ratio, in accordance with at least one of start and termination of a fuel-cut operation that stops supply of fuel to an internal combustion engine.

10. An abnormality determination device for an air-fuel ratio sensor, comprising:

a differential value calculator configured to calculate a differential value of an output value of the air-fuel ratio sensor which is configured to detect an air-fuel ratio of exhaust gas; and an abnormality determiner configured to determine abnormality of the air-fuel ratio sensor based on a result of comparison between a reference output value of the air-fuel ratio sensor and a predetermined threshold, the reference output value being obtained by the air-fuel ratio sensor when the differential value calculated by the differential value calculator becomes a predetermined value, wherein the air-fuel ratio sensor has an output characteristic that a rate of change of the air-fuel ratio of the exhaust gas becomes maximum around a theoretical exhaust gas air-fuel ratio which is an exhaust gas air-fuel ratio corresponding to a theoretical air-fuel ratio of air-fuel mixture, the predetermined value is a local extremum of the differential value, the predetermined threshold includes a first threshold and a second threshold, and the abnormality determiner is configured to determine abnormality of the air-fuel ratio sensor in accordance with whether or not the reference output value of the air-fuel ratio sensor is between the first threshold and the second threshold.

11. The abnormality determination device according to claim 10, wherein the abnormality determiner determines abnormality of the air-fuel ratio sensor when the air-fuel ratio of the exhaust gas changes from rich to lean with respect to a theoretical exhaust gas air-fuel ratio which is an exhaust gas air-fuel ratio corresponding to a theoretical air-fuel ratio of air-fuel mixture, passing through the theoretical exhaust gas air-fuel ratio, in accordance with at least one of start and termination of a fuel-cut operation that stops supply of fuel to an internal combustion engine.

12. The abnormality determination device according to claim 10, wherein the abnormality determiner determines that an output value of the air-fuel ratio sensor is normal if the reference output value of the air-fuel ratio sensor is between the first threshold and the second threshold, and the abnormality determiner determines that abnormality of the air-fuel ratio sensor has occurred if the reference output value of the air-fuel ratio sensor is greater than the first threshold or smaller than the second threshold.

13. The abnormality determination device according to claim 10, wherein the predetermined threshold includes a fifth threshold set to at least one of an approximately upper limit and an approximately lower limit of an output range of the air-fuel ratio sensor, and the abnormality determiner is configured to determine abnormality of the air-fuel ratio sensor in accordance with whether or not the output value of the air-fuel ratio sensor has changed across the fifth threshold.

14. The abnormality determination device according to claim 13, wherein the abnormality determiner determines abnormality of the air-fuel ratio sensor when the air-fuel ratio of the exhaust gas changes from rich to lean with respect to a theoretical exhaust gas air-fuel ratio which is an exhaust gas air-fuel ratio corresponding to a theoretical air-fuel ratio of air-fuel mixture, passing through the theoretical exhaust gas air-fuel ratio, in accordance with at least one of start and termination of a fuel-cut operation that stops supply of fuel to an internal combustion engine.

15. The abnormality determination device according to claim 10, wherein the air-fuel ratio sensor has an output characteristic that a rate of change of the air-fuel ratio of the exhaust gas becomes maximum around a theoretical exhaust gas air-fuel ratio which is an exhaust gas air-fuel ratio corresponding to a theoretical air-fuel ratio of air-fuel mixture, the predetermined value includes a value between 0 and a local extremum of the differential value, the predetermined threshold includes a third threshold and a fourth threshold, and the abnormality determiner is configured to determine abnormality of the air-fuel ratio sensor in accordance with whether or not the reference output value of the air-fuel ratio sensor is between the third threshold and the fourth threshold.

16. The abnormality determination device according to claim 15, wherein the abnormality determiner determines abnormality of the air-fuel ratio sensor when the air-fuel ratio of the exhaust gas changes from rich to lean with respect to a theoretical exhaust gas air-fuel ratio which is an exhaust gas air-fuel ratio corresponding to a theoretical air-fuel ratio of air-fuel mixture, passing through the theoretical exhaust gas air-fuel ratio, in accordance with at least one of start and termination of a fuel-cut operation that stops supply of fuel to an internal combustion engine.

17. The abnormality determination device according to claim 15, wherein the predetermined threshold includes a fifth threshold set to at least one of an approximately upper limit and an approximately lower limit of an output range of the air-fuel ratio sensor, and the abnormality determiner is configured to determine abnormality of the air-fuel ratio sensor in accordance with whether or not the output value of the air-fuel ratio sensor has changed across the fifth threshold.

18. The abnormality determination device according to claim 17, wherein the abnormality determiner determines abnormality of the air-fuel ratio sensor when the air-fuel ratio of the exhaust gas changes from rich to lean with respect to a theoretical exhaust gas air-fuel ratio which is an exhaust gas air-fuel ratio corresponding to a theoretical air-fuel ratio of air-fuel mixture, passing through the theoretical exhaust gas air-fuel ratio, in accordance with at least one of start and termination of a fuel-cut operation that stops supply of fuel to an internal combustion engine.

* * * * *